(12) United States Patent
Wang et al.

(10) Patent No.: US 12,316,466 B2
(45) Date of Patent: May 27, 2025

(54) SOFT MULTIPLEXING OF FEEDBACK

(71) Applicant: QUALCOMM Incorporated, San Diego, CA (US)

(72) Inventors: Xiaojie Wang, Hillsborough, NJ (US); Junyi Li, Franklin Park, NJ (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 17/241,964

(22) Filed: Apr. 27, 2021

(65) Prior Publication Data

US 2022/0345255 A1    Oct. 27, 2022

(51) Int. Cl.
*H04L 1/1867* (2023.01)
*H04W 24/08* (2009.01)
*H04W 72/02* (2009.01)
*H04W 72/0446* (2023.01)
*H04W 72/0453* (2023.01)

(52) U.S. Cl.
CPC ........... *H04L 1/1896* (2013.01); *H04W 24/08* (2013.01); *H04W 72/02* (2013.01); *H04W 72/0446* (2013.01); *H04W 72/0453* (2013.01)

(58) Field of Classification Search
CPC ... H04L 1/1896; H04L 5/0091; H04L 1/1861; H04L 5/0044; H04L 5/0055; H04L 1/1692; H04L 1/0028; H04W 24/08; H04W 72/02; H04W 72/0446; H04W 72/0453; H04J 11/0026; H04J 13/0003
See application file for complete search history.

(56) References Cited

U.S. PATENT DOCUMENTS

| | | | | |
|---|---|---|---|---|
| 2006/0056360 A1* | 3/2006 | Parkvall | ............... | H04B 1/7103 375/138 |
| 2007/0258540 A1* | 11/2007 | Ratasuk | ................ | H04L 5/0091 375/267 |
| 2008/0298433 A1* | 12/2008 | Tiirola | ................ | H04J 13/0062 375/132 |

(Continued)

OTHER PUBLICATIONS

International Search Report and Written Opinion—PCT/US2022/017710—ISA/EPO—May 30, 2022.

(Continued)

*Primary Examiner* — Thinh D Tran
(74) *Attorney, Agent, or Firm* — Holland & Hart LLP

(57) ABSTRACT

Methods, systems, and devices for wireless communications are described. For instance, a wireless device (e.g., a user equipment (UE), a base station) may transmit a set of data messages to a set of UEs, the set of data messages including one or more data messages for each UE of the set of UEs. Each UE may select a respective sequence representing feedback associated with the one or more data messages, the sequence being selected from a sequence pool that includes a first plurality of sequences representing acknowledgement feedback and a second plurality of sequences representing negative acknowledgement feedback, individual sequences of at least the second set of sequences being non-orthogonal to each other. Each UE may transmit the respective selected sequence to the wireless device via a shared set of time and frequency resources that are shared for feedback messages from the set of UEs.

30 Claims, 17 Drawing Sheets

(56) References Cited

U.S. PATENT DOCUMENTS

| | | | | |
|---|---|---|---|---|
| 2010/0034076 A1* | 2/2010 | Kishiyama | ............ | H04J 13/004 |
| | | | | 370/210 |
| 2019/0230665 A1* | 7/2019 | Lopez-Perez | ....... | H04L 27/0006 |
| 2019/0289623 A1* | 9/2019 | Kim | ...................... | H04L 1/1893 |
| 2019/0356423 A1* | 11/2019 | Lee | ........................ | H04L 1/1607 |
| 2020/0236524 A1* | 7/2020 | Ye | ......................... | H04L 5/0094 |
| 2021/0328725 A1* | 10/2021 | Jassal | .................... | H04L 1/1812 |
| 2023/0006799 A1* | 1/2023 | Goektepe | .............. | H04L 1/1893 |

OTHER PUBLICATIONS

NTT Docomo., et al., "CDM-based Multiplexing Method of Multiple ACK/NACK and CQI for E-Utra Uplink," 3GPP TSG RAN WG1 Meeting #46bis R1-062742, Seoul, Korea, Oct. 9-13, 2006, pp. 1-6, XP050103230, [Retrieved on Oct. 4, 2006] Section 3.1 "Principle of Orthogonal COM-Based Multiplexing of ACK/NACK and CQI bits", p. 2-p. 4, Figure 3.

* cited by examiner

SOFT MULTIPLEXING OF FEEDBACK

FIELD OF TECHNOLOGY

The following relates to wireless communications, including soft multiplexing of feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support soft multiplexing of feedback. Generally, the described techniques provide for a wireless device to use fewer resources to receive feedback from a set of user equipments (UEs). For instance, a wireless device (e.g., a UE, a base station) may transmit a set of data messages to a set of UEs, the set of data messages including one or more data messages for each UE of the set of UEs. Each UE may select a respective sequence representing feedback associated with the one or more data messages, the sequence being selected from a sequence pool that includes a first plurality of sequences representing acknowledgement feedback and a second plurality of sequences representing negative acknowledgement feedback, individual sequences of at least the second set of sequences being non-orthogonal to each other. Each UE may transmit the respective selected sequence to the wireless device via a shared set of time and frequency resources that are shared for feedback messages from the set of UEs.

A method for wireless communication at a UE is described. The method may include receiving one or more data messages from a wireless device, the one or more data messages being of a set of multiple data messages transmitted from the wireless device to a set of multiple UEs, selecting a sequence representing feedback associated with the one or more data messages, the sequence being selected from a sequence pool that includes a first set of multiple sequences representing acknowledgment feedback and a second set of multiple sequences representing negative acknowledgment feedback, individual sequences of at least the second set of multiple sequences being non-orthogonal to each other, and transmitting the sequence to the wireless device via a shared set of time and frequency resources, the shared set of time and frequency resources being shared for feedback messages from the set of multiple UEs.

An apparatus for wireless communication at a UE is described. The apparatus may include a processor, memory coupled with the processor, and instructions stored in the memory. The instructions may be executable by the processor to cause the apparatus to receive one or more data messages from a wireless device, the one or more data messages being of a set of multiple data messages transmitted from the wireless device to a set of multiple UEs, select a sequence representing feedback associated with the one or more data messages, the sequence being selected from a sequence pool that includes a first set of multiple sequences representing acknowledgment feedback and a second set of multiple sequences representing negative acknowledgment feedback, individual sequences of at least the second set of multiple sequences being non-orthogonal to each other, and transmit the sequence to the wireless device via a shared set of time and frequency resources, the shared set of time and frequency resources being shared for feedback messages from the set of multiple UEs.

Another apparatus for wireless communication at a UE is described. The apparatus may include means for receiving one or more data messages from a wireless device, the one or more data messages being of a set of multiple data messages transmitted from the wireless device to a set of multiple UEs, means for selecting a sequence representing feedback associated with the one or more data messages, the sequence being selected from a sequence pool that includes a first set of multiple sequences representing acknowledgment feedback and a second set of multiple sequences representing negative acknowledgment feedback, individual sequences of at least the second set of multiple sequences being non-orthogonal to each other, and means for transmitting the sequence to the wireless device via a shared set of time and frequency resources, the shared set of time and frequency resources being shared for feedback messages from the set of multiple UEs.

A non-transitory computer-readable medium storing code for wireless communication at a UE is described. The code may include instructions executable by a processor to receive one or more data messages from a wireless device, the one or more data messages being of a set of multiple data messages transmitted from the wireless device to a set of multiple UEs, select a sequence representing feedback associated with the one or more data messages, the sequence being selected from a sequence pool that includes a first set of multiple sequences representing acknowledgment feedback and a second set of multiple sequences representing negative acknowledgment feedback, individual sequences of at least the second set of multiple sequences being non-orthogonal to each other, and transmit the sequence to the wireless device via a shared set of time and frequency resources, the shared set of time and frequency resources being shared for feedback messages from the set of multiple UEs.

In some examples of the method, apparatuses, and non-transitory computer-readable medium described herein, selecting the sequence may include operations, features, means, or instructions for selecting the sequence from the sequence pool, where individual sequences of the first set of multiple sequences of the sequence pool may be orthogonal with each other, and where each sequence of the first set of multiple sequences may be orthogonal with each sequence of the second set of multiple sequences.

In some examples of the method, apparatuses, and non-transitory computer-readable medium described herein, selecting the sequence may include operations, features, means, or instructions for selecting the sequence from the sequence pool, where individual sequences of the first set of multiple sequences of the sequence pool may be orthogonal with each other, and where each sequence of the first set of multiple sequences may be non-orthogonal with each sequence of the second set of multiple sequences.

In some examples of the method, apparatuses, and non-transitory computer-readable medium described herein, selecting the sequence may include operations, features, means, or instructions for selecting the sequence from the sequence pool, where individual sequences of the first set of multiple sequences of the sequence pool may be non-orthogonal with each other, and where each sequence of the first set of multiple sequences may be orthogonal with each sequence of the second set of multiple sequences.

In some examples of the method, apparatuses, and non-transitory computer-readable medium described herein, selecting the sequence may include operations, features, means, or instructions for selecting the sequence from the sequence pool, where individual sequences of the first set of multiple sequences of the sequence pool may be non-orthogonal with each other, and where each sequence of the first set of multiple sequences may be non-orthogonal with each sequence of the second set of multiple sequences.

Some examples of the method, apparatuses, and non-transitory computer-readable medium described herein may further include operations, features, means, or instructions for transmitting the sequence to the wireless device via the shared set of time and frequency resources includes transmitting the sequence via a resource block of the shared set of time and frequency resources, and a total number of resource blocks associated with the shared set of time and frequency resources may be less than a total number of UEs of the set of multiple UEs.

Some examples of the method, apparatuses, and non-transitory computer-readable medium described herein may further include operations, features, means, or instructions for receiving, from the wireless device, an assignment of a first sequence of the first set of multiple sequences and a second sequence of the second set of multiple sequences, where the selected sequence includes one of the first sequence or the second sequence.

In some examples of the method, apparatuses, and non-transitory computer-readable medium described herein, the one or more data messages include a first data message and the method, apparatuses, and non-transitory computer-readable medium may include further operations, features, means, or instructions for selecting an additional sequence representing feedback for the first data message, the additional sequence selected from the sequence pool and transmitting the additional sequence to the wireless device via the shared set of time and frequency resources.

In some examples of the method, apparatuses, and non-transitory computer-readable medium described herein, the one or more data messages include a first data message and a second data message and the method, apparatuses, and non-transitory computer-readable medium may include further operations, features, means, or instructions for selecting an additional sequence representing feedback for the second data message, the additional sequence selected from the sequence pool and transmitting the additional sequence to the wireless device via the shared set of time and frequency resources.

Some examples of the method, apparatuses, and non-transitory computer-readable medium described herein may further include operations, features, means, or instructions for receiving, from the wireless device, an indication for the UE to select at least two sequences for the one or more data messages, selecting an additional sequence representing feedback for the one or more data messages based on receiving the indication for the UE to select the at least two sequences, and transmitting the additional sequence to the wireless device via the shared set of time and frequency resources.

In some examples of the method, apparatuses, and non-transitory computer-readable medium described herein, a total number of degrees of freedom between sequences of the second set of multiple sequences may be less than a total number of degrees of freedom between sequences of the first set of multiple sequences.

In some examples of the method, apparatuses, and non-transitory computer-readable medium described herein, the wireless device includes a UE excluded from the set of multiple UEs and the sequence may be transmitted via a sidelink shared channel.

In some examples of the method, apparatuses, and non-transitory computer-readable medium described herein, the wireless device includes a base station and the sequence may be transmitted via an uplink shared channel.

In some examples of the method, apparatuses, and non-transitory computer-readable medium described herein, a total number of degrees of freedom between sequences of the second set of multiple sequences may be associated with a retransmission capability of the wireless device.

In some examples of the method, apparatuses, and non-transitory computer-readable medium described herein, the individual sequences of at least the second set of multiple sequences may be non-orthogonal to each other based on the total number of degrees of freedom being below a threshold.

A method for wireless communication at a wireless device is described. The method may include transmitting a set of multiple data messages to a set of multiple UEs, the set of multiple data messages including one or more data messages for each UE of the set of multiple UEs, monitoring a shared set of time and frequency resources for one or more sequences representing feedback associated with the set of multiple data messages, the one or more sequences being of a sequence pool that includes a first set of multiple sequences representing acknowledgement feedback and a second set of multiple sequences representing negative acknowledgment feedback, individual sequences of at least the second set of multiple sequences being non-orthogonal to each other, and receiving the one or more sequences based on the monitoring.

An apparatus for wireless communication at a wireless device is described. The apparatus may include a processor, memory coupled with the processor, and instructions stored in the memory. The instructions may be executable by the processor to cause the apparatus to transmit a set of multiple data messages to a set of multiple UEs, the set of multiple data messages including one or more data messages for each UE of the set of multiple UEs, monitor a shared set of time and frequency resources for one or more sequences representing feedback associated with the set of multiple data messages, the one or more sequences being of a sequence pool that includes a first set of multiple sequences representing acknowledgement feedback and a second set of multiple sequences representing negative acknowledgment feedback, individual sequences of at least the second set of multiple sequences being non-orthogonal to each other, and receive the one or more sequences based on the monitoring.

Another apparatus for wireless communication at a wireless device is described. The apparatus may include means for transmitting a set of multiple data messages to a set of multiple UEs, the set of multiple data messages including one or more data messages for each UE of the set of multiple UEs, means for monitoring a shared set of time and frequency resources for one or more sequences representing feedback associated with the set of multiple data messages, the one or more sequences being of a sequence pool that includes a first set of multiple sequences representing acknowledgement feedback and a second set of multiple sequences representing negative acknowledgment feedback, individual sequences of at least the second set of multiple sequences being non-orthogonal to each other, and means for receiving the one or more sequences based on the monitoring.

A non-transitory computer-readable medium storing code for wireless communication at a wireless device is described. The code may include instructions executable by a processor to transmit a set of multiple data messages to a set of multiple UEs, the set of multiple data messages including one or more data messages for each UE of the set of multiple UEs, monitor a shared set of time and frequency resources for one or more sequences representing feedback associated with the set of multiple data messages, the one or more sequences being of a sequence pool that includes a first set of multiple sequences representing acknowledgement feedback and a second set of multiple sequences representing negative acknowledgment feedback, individual sequences of at least the second set of multiple sequences being non-orthogonal to each other, and receive the one or more sequences based on the monitoring.

In some examples of the method, apparatuses, and non-transitory computer-readable medium described herein, monitoring the shared set of time and frequency resources may include operations, features, means, or instructions for monitoring the shared set of time and frequency resources for the one or more sequences, where individual sequences of the first set of multiple sequences of the sequence pool may be orthogonal with each other, and where each sequence of the first set of multiple sequences may be orthogonal with each sequence of the second set of multiple sequences.

In some examples of the method, apparatuses, and non-transitory computer-readable medium described herein, monitoring the shared set of time and frequency resources may include operations, features, means, or instructions for monitoring the shared set of time and frequency resources for the one or more sequences, where individual sequences of the first set of multiple sequences of the sequence pool may be orthogonal with each other, and where each sequence of the first set of multiple sequences may be non-orthogonal with each sequence of the second set of multiple sequences.

In some examples of the method, apparatuses, and non-transitory computer-readable medium described herein, monitoring the shared set of time and frequency resources may include operations, features, means, or instructions for monitoring the shared set of time and frequency resources for the one or more sequences, where individual sequences of the first set of multiple sequences of the sequence pool may be non-orthogonal with each other, and where each sequence of the first set of multiple sequences may be orthogonal with each sequence of the second set of multiple sequences.

In some examples of the method, apparatuses, and non-transitory computer-readable medium described herein, monitoring the shared set of time and frequency resources may include operations, features, means, or instructions for monitoring the shared set of time and frequency resources for the one or more sequences, where individual sequences of the first set of multiple sequences of the sequence pool may be non-orthogonal with each other, and where each sequence of the first set of multiple sequences may be non-orthogonal with each sequence of the second set of multiple sequences.

In some examples of the method, apparatuses, and non-transitory computer-readable medium described herein, receiving the one or more sequences may include operations, features, means, or instructions for receiving at least one sequence of the one or more sequences via a resource block of the shared set of time and frequency resources, where a total number of resource blocks associated with the shared set of time and frequency resources may be less than a total number of UEs of the set of multiple UEs.

Some examples of the method, apparatuses, and non-transitory computer-readable medium described herein may further include operations, features, means, or instructions for transmitting, to each UE of the set of multiple UEs, an assignment of a respective first sequence of the first set of multiple sequences and a respective second sequence of the second set of multiple sequences, where the one or more sequences includes one of the respective first sequence and the respective second sequence for each UE of the set of multiple UEs.

In some examples of the method, apparatuses, and non-transitory computer-readable medium described herein, the one or more data messages for a UE of the set of multiple UEs include a first data message and the method, apparatuses, and non-transitory computer-readable medium may include further operations, features, means, or instructions for monitoring the shared set of time and frequency resources for a first sequence of the one or more sequences representing feedback for the first data message and a second sequence of the one or more sequences representing feedback for the first data message, the first sequence and the second sequence selected from the sequence pool and receiving, from the UE of the set of multiple UEs, the first sequence and the second sequence.

In some examples of the method, apparatuses, and non-transitory computer-readable medium described herein, the one or more data messages for a UE of the set of multiple UEs include a first data message and a second data message and the method, apparatuses, and non-transitory computer-readable medium may include further operations, features, means, or instructions for monitoring the shared set of time and frequency resources for a first sequence of the one or more sequences representing feedback for the first data message and a second sequence of the one or more sequences representing feedback for the second data message, the first sequence and the second sequence selected from the sequence pool and receiving, from the UE of the set of multiple UEs, the first sequence and the second sequence.

Some examples of the method, apparatuses, and non-transitory computer-readable medium described herein may further include operations, features, means, or instructions for transmitting, to a UE of the set of multiple UEs, an indication for the UE to select at least two sequences for the one or more data messages for the UE, monitoring the shared set of time and frequency resources for a first sequence representing feedback for the one or more data messages for the UE and a second sequence representing feedback for the one or more data messages for the UE based on transmitting the indication for the UE to select the at least two sequences, and receiving, from the UE of the set of multiple UEs, the first sequence and the second sequence.

In some examples of the method, apparatuses, and non-transitory computer-readable medium described herein, a total number of degrees of freedom between sequences of the second set of multiple sequences may be less than a total number of degrees of freedom between sequences of the first set of multiple sequences.

In some examples of the method, apparatuses, and non-transitory computer-readable medium described herein, the wireless device includes a UE excluded from the set of multiple UEs and each of the one or more sequences may be received via a respective sidelink shared channel.

In some examples of the method, apparatuses, and non-transitory computer-readable medium described herein, the wireless device includes a base station and the each of the one or more sequences may be received via a respective uplink shared channel.

DETAILED DESCRIPTION

Figure 1:
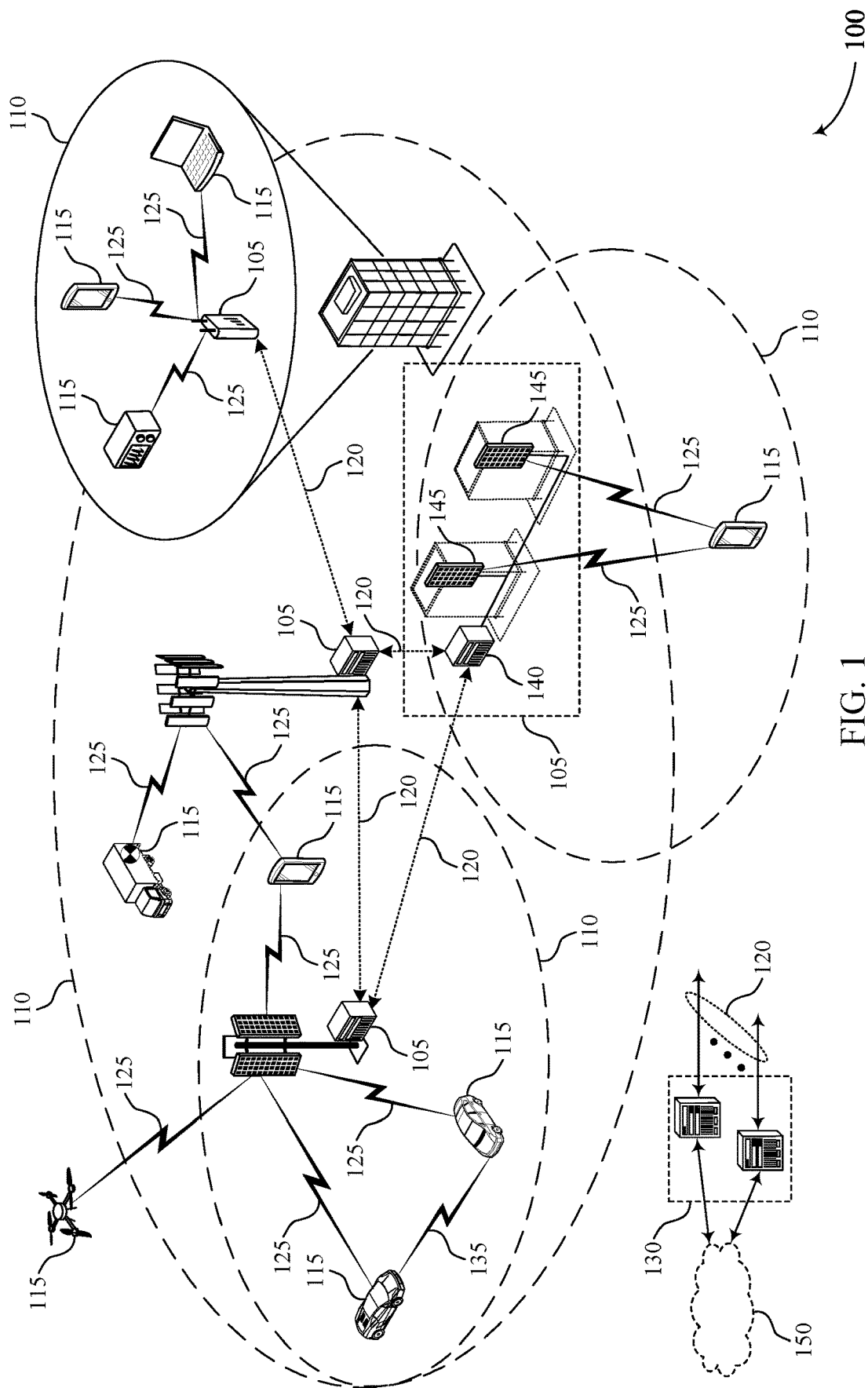
FIG. 1 illustrates an example of a wireless communications system that supports soft multiplexing of feedback in accordance with aspects of the present disclosure.

A wireless device, such as a user equipment (UE), a base station, or a programmable logic controller (PLC), may communicate with a set of UEs simultaneously. In some examples, the wireless device may transmit one or more data transmissions (e.g., data messages) to each of the UEs and may receive feedback from the UEs indicating whether the data transmissions were received successfully. The feedback may include one or more sequences corresponding to an acknowledgement (ACK) (i.e., ACK sequences) for each of the one or more data transmissions that a UE has received and successfully decoded and may include one or more sequences corresponding to a negative acknowledgment (NACK) (i.e., NACK sequences) for each of the one or more data transmissions that the UE has failed to receive and/or has failed to decode. The wireless device may retransmit each data transmission for which a sequence corresponding to a NACK was indicated.

In some examples, each UE may be assigned an exclusive one or more resource blocks for conveying feedback to the wireless device. However, limiting a resource block to a single UE may include the wireless device receiving feedback over a greater number of resource blocks as compared to enabling a resource block to convey feedback for multiple UEs of the set of UEs. Additionally, the wireless device may have a limited number of retransmissions that the wireless device may perform. In some examples, the wireless device may support as many degrees of freedom (DoF) for NACK sequences as there are UEs in the set of UEs with which the wireless device communicates. However, if the number of retransmissions supported by the wireless device is less than the number of UEs in the set of UEs, a fewer number of DoF may be used to convey feedback for NACK sequences. In some examples, the number of resource blocks that are used to convey feedback may increase as the DoF supported by the wireless device increases. Accordingly, if the limited number of retransmissions is fewer than the supported DoFs for NACK sequences, the UE may use more resource blocks than if the supported DoFs are equal to the limited number of retransmissions. Generally, using more resource blocks may decrease resources available for other transmissions and may decrease the efficiency of communications.

The methods described herein may enable the number of resource blocks used to convey feedback to be reduced by using a shared set of time and frequency resources for conveying feedback and/or by supporting a reduced number of DoF for NACK sequences. In order to support a reduced number of resource blocks used to convey feedback, each NACK sequence used to convey NACK feedback may be non-orthogonal with each other NACK sequence used to convey NACK feedback. In some examples, each ACK sequence may be orthogonal with each other ACK sequence. In some such examples, the number of resource blocks may be reduced by orthogonally multiplexing ACK feedback according to a cyclic shift. However, in other examples, the ACK sequences may be non-orthogonal to each other. Additionally, there may be examples in which ACK sequences are non-orthogonal to NACK sequences. By using sequences that are non-orthogonal to each other (e.g., NACK sequences relative to other NACK sequences, ACK sequences relative to other ACK sequences, NACK sequences relative to ACK sequences, or any combination thereof), the wireless device may support a reduced number of resource blocks used to convey feedback.

Aspects of the disclosure are initially described in the context of wireless communications systems. Additional aspects of the disclosure are described in the context of a resource sharing scheme and a process flow. Aspects of the disclosure are further illustrated by and described with reference to apparatus diagrams, system diagrams, and flowcharts that relate to soft multiplexing of feedback.

FIG. 1 illustrates an example of a wireless communications system 100 that supports soft multiplexing of feedback in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A wireless device, such as a UE 115, a base station 105, or a PLC, may communicate with a set of UEs 115 simultaneously. In some examples, the wireless device may transmit one or more data transmissions to each of the UEs 115 and may receive feedback from the UEs 115 indicating whether the data transmissions were received successfully. The feedback may include one or more sequences corresponding to an acknowledgement (ACK) (i.e., ACK sequences) for each of the one or more data transmissions that a UE 115 has received and successfully decoded and may include one or more sequences corresponding to a negative acknowledgment (NACK) (i.e., NACK sequences) for each of the one or more data transmissions that the UE 115 has failed to receive and/or has failed to decode. The wireless device may retransmit each data transmission for which a sequence corresponding to a NACK was indicated.

In some examples, each UE 115 may be assigned an exclusive one or more resource blocks for conveying feedback to the wireless device. However, limiting a resource block to a single UE 115 may include the wireless device receiving feedback over a greater number of resource blocks as compared to enabling a resource block to convey feedback for multiple UEs 115 of the set of UEs 115. Additionally, the wireless device may have a limited number of retransmissions that the wireless device may perform. In some examples, the wireless device may support as many degrees of freedom (DoF) for NACK sequences as there are UEs 115 in the set of UEs 115 with which the wireless device communicates. However, if the number of retransmissions supported by the wireless device is less than the number of UEs 115 in the set of UEs 115, a fewer number of DoF may be used to convey feedback for NACK sequences. In some examples, the number of resource blocks that are used to convey feedback may increase as the DoF supported by the wireless device increases. Accordingly, if the limited number of retransmissions is fewer than the supported DoFs for NACK sequences, the UE 115 may use more resource blocks than if the supported DoFs are equal to the limited number of retransmissions. Generally, using more resource blocks may decrease resources available for other transmissions and may decrease the efficiency of communications.

The methods described herein may enable the number of resource blocks used to convey feedback to be reduced by using a shared set of time and frequency resources for conveying feedback and/or by supporting a reduced number of DoF for NACK sequences. In order to support a reduced number of resource blocks used to convey feedback, each NACK sequence used to convey NACK feedback may be non-orthogonal with each other NACK sequence used to convey NACK feedback. In some examples, each ACK sequence may be orthogonal with each other ACK sequence. In some such examples, the number of resource blocks may be reduced by orthogonally multiplexing ACK feedback according to a cyclic shift. However, in other examples, the ACK sequences may be non-orthogonal to each other. Additionally, there may be examples in which ACK sequences are non-orthogonal to NACK sequences. By using sequences that are non-orthogonal to each other (e.g., NACK sequences relative to other NACK sequences, ACK sequences relative to other ACK sequences, NACK sequences relative to ACK sequences, or any combination thereof), the wireless device may support a reduced number of resource blocks used to convey feedback.

Figure 2:
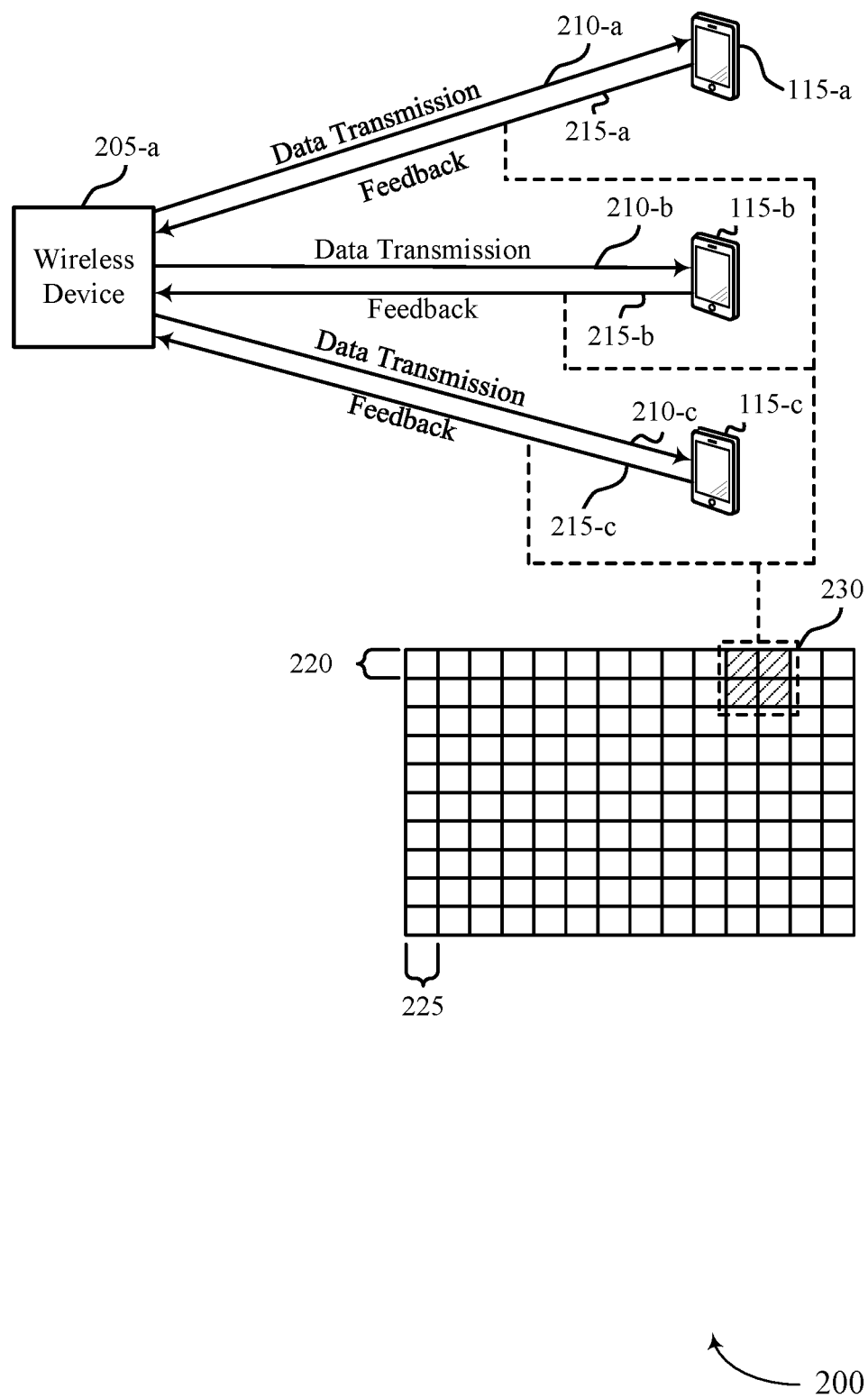
FIG. 2 illustrates an example of a wireless communications system that supports soft multiplexing of feedback in accordance with aspects of the present disclosure.

FIG. 2 illustrates an example of a wireless communications system 200 that supports soft multiplexing of feedback in accordance with aspects of the present disclosure. In some examples, wireless communications system 200 may be implemented by one or more aspects of wireless communications system 100. For instance, wireless device 205-a may be an example of a UE 115 or a base station 105 as described with reference to FIG. 1. In some examples, wireless device 205-a may be an example of a programmable logic controller (PLC). Additionally or alternatively, UEs 115-a, 115-b, and 115-c may be examples of UEs 115 as described with reference to FIG. 1.

Wireless device 205-a may transmit data transmission 210-a (e.g., data message) to UE 115-a, data transmission 215-b to UE 115-b, and data transmission 210-c to UE 115-c. If wireless device 205-a is an example of a base station 105, each of data transmissions 210-a, 210-b, and 210-c may be an example of a shared downlink channel transmission (e.g., a physical downlink shared channel (PDSCH) transmission). However, if wireless device 205-a is an example of a UE 115, each of data transmissions 210-a, 210-b, and 210-c may be an example of a shared sidelink channel transmission (e.g., a physical sidelink shared channel (PSSCH) transmission). In some examples, UEs 115-a, 115-b and 115-c may be included in a set of UEs 115.

Wireless device 205-a may receive feedback 215-a from UE 115-a, feedback 215-b from UE 115-b, and feedback 215-c from UE 115-c based on transmitting data transmissions 210-a, 210-b, and 210-c, respectively. In some examples, data transmissions 210-a, 210-b, and 210-c may include a same message and/or may be broadcast together. In other examples, some or each of data transmissions 210-a, 210-b, and 210-c may include different messages. In some examples, feedback 215-a, 215-b, and 215-c may be examples of hybrid automatic repeat request (HARD) feedback. Additionally or alternatively, feedback 215-a, 215-b, and 215-c may include one or more of acknowledgement (ACK) feedback and negative acknowledgement (NACK) feedback. ACK feedback may indicate that a respective UE 115 has successfully received and decoded a data transmission from wireless device 205-a. For instance, feedback 215-a including an ACK for data transmission 210-a may indicate that UE 115-a has successfully received and decoded data transmission 210-a. NACK feedback may indicate that a respective UE 115 has failed to receive or decode a data transmission from wireless device 205-a. For instance, feedback 215-a including a NACK for data transmission 210-a may indicate that UE 115-a has failed to receive or decode data transmission 210-a.

In some examples, a UE 115 may use a first sequence to convey ACK feedback and a second sequence to convey NACK sequence. For instance, wireless device 205-a may transmit an assignment of an ACK sequence and a NACK sequence to each UE 115 of the set of UEs 115 (e.g., UEs 115-a, 115-b, and 115-c). In some examples, wireless device 205-a may select the ACK sequence from a pool of ACK sequences (e.g., 50 ACK sequences) and may select the NACK sequence from a pool of NACK sequences (e.g., 50 NACK sequences) and may assign each UE 115 of the set of UEs 115 the selected ACK and NACK sequences.

In some examples, the NACK sequences may be orthogonal with each other, and the ACK sequences may be orthogonal to each other. Accordingly, if the set of UEs 115 contains N UEs 115 (e.g., 50 UEs 115), feedback may be conveyed over a number of resources that supports 2N DoF (100 DoF). For instance, each ACK sequence and/or NACK sequence may be an example of a Zadoff-Chu sequence and/or a computer-generated sequence with a peak to average power ratio (PAPR) below a threshold amount. In one example, up to M cyclic shifts (e.g., 12 cyclic shifts) may be available for each resource block. Accordingly, with orthogonal multiplexing, feedback for the N UEs 115 may be conveyed with ceiling(2N/M) RBs, where ceiling( ) may represent rounding up 2N/M to a next integer value or keeping 2N/M at the current value if 2N/M is already an integer value. Without multiplexing, N RBs may be used to convey feedback.

The number of RBs used to convey feedback may be reduced further by using non-orthogonal NACK and/or ACK sequences. For instance, if the set of UEs 115 contain N UEs 115 (e.g., 50 UEs 115), feedback may be conveyed over a number of resources that support $N_1+N_2$ DoF where $N_1$ corresponds to the DoF of ACK sequences and $N_2$ corresponds to the DoF of NACK sequences. Generally, $N_1+N_2 \leq 2N$ (e.g., less than 100). Accordingly, in some examples, $$\text{ceiling}\left(\frac{N_1+N_2}{M}\right) \leq \text{ceiling}\left(\frac{2N}{M}\right).$$

For instance, in one example, $N_1=50$, $N_2=3$, and $M=12$. In such examples, $$\text{ceiling}\left(\frac{53}{12}\right) = 6 RBs$$

may be used to convey feedback as opposed to $$\text{ceiling}\left(\frac{50+50}{12}\right) = 9 RBs.$$

In order to support fewer DoF, non-orthogonal sequences (e.g., a Baker sequence, an m-sequence, a Gold sequence) may be used for sequences with fewer than N DoF.

In a first example, ACK sequences may be orthogonal to each other and NACK sequences may be non-orthogonal with each other. Additionally, NACK sequences may be orthogonal to ACK sequences (e.g., NACK sequences and ACK sequences may reside in an orthogonal subspace and/or may use different resources).

In a second example, ACK sequences may be orthogonal to each other and NACK sequences may be non-orthogonal with each other. Additionally, NACK sequences may be non-orthogonal to ACK sequences (e.g., NACK sequences and ACK sequences may not reside in an orthogonal subspace and/or may use the same resources).

In a third example, ACK sequences may be non-orthogonal with each other and NACK sequences may be non-orthogonal with each other. Additionally, NACK sequences may be orthogonal to ACK sequences (e.g., NACK sequences and ACK sequences may reside in an orthogonal subspace and/or may use different resources).

In a fourth example, ACK sequences may be non-orthogonal with each other and NACK sequences may be non-orthogonal with each other. Additionally, NACK sequences may be non-orthogonal to ACK sequences (e.g., NACK sequences and ACK sequences may not reside in an orthogonal subspace and/or may use the same resources).

Generally, the first example may be associated, on average, with less interference than the second example and the third example, and the second example and the third example may be associated, on average, with less interference than the fourth example. However, the fourth example may be associated with less resource usage than the second example and the third example, and the second example and the third example may be associated with less resource usage than the first example.

In some examples, a cross-correlation between non-orthogonal ACKs may be represented by $\rho_1$, a cross-correlation between a non-orthogonal ACK and a non-orthogonal NACK may be represented by $\rho_2$, and a cross-correlation between non-orthogonal NACKs may be represented by $\rho_3$. In some examples, the first example may be associated with zero values for $\rho_1$ and $\rho_2$ and a non-zero value for $\rho_3$. In some examples, the second example may be associated with a zero value for $\rho_1$ and a non-zero value for $\rho_2$ and $\rho_3$. In some examples, the third example may be associated with a zero value for $\rho_2$ and a non-zero value for $\rho_1$ and $\rho_3$. In some examples, the fourth example may be associated with a non-zero value for $\rho_1$, $\rho_2$, and $\rho_3$.

In some examples, an SIR associated with ACK sequences may increase as a number of NACK sequences received by wireless device 205-a increases (e.g., due to a number of non-orthogonal ACK sequences being received decreasing). In some examples, the SIR of ACK sequences may be equal to or proportional to $$\frac{1}{X\rho_1 + Y\rho_2},$$

where X is the number of ACK sequences transmitted to wireless device 205-a subtracted by 1, and Y is the number of NACK sequences transmitted to wireless device 205-a subtracted by one (except for when 0 NACK sequences are transmitted in which case Y=0). Additionally or alternatively, the SIR of NACK sequences may be equal to or proportional to $$\frac{1}{Y\rho_3 + X\rho_2}.$$

In some examples, Y=Z−X, where Z may represent a constant associated with a total number of sequences received at wireless device 205-a. Accordingly, if Y decreases, X may increase.

In some examples, wireless device 205-a may select and assign ACK and/or NACK sequences based on one or more of $\rho_1$, $\rho_2$, and $\rho_3$. For instance, wireless device 205-a may use one or more of values of $\rho_1$, $\rho_2$, and $\rho_3$ to determine a detection performance of feedback for one or more of the first example, the second example, the third example, and fourth example as described herein (e.g., or for other examples in which NACK sequences are orthogonal and ACK sequences are non-orthogonal to each other and/or relative to NACK sequences). In some examples, wireless device 205-a may prioritize a detection probability of one example over another example based on a feedback channel reliability constraint and/or a number of retransmissions supported by wireless device 205-a. Accordingly, wireless device 205-a may set one or more of $\rho_2$, and $\rho_3$ to particular values and may assign sequences to UEs 115 (e.g., UEs 115-a, 115-b, 115-c) based on the particular values.

In some examples, wireless device 205-a may adaptively change sequences according to traffic reliability and/or latency constraints, channel conditions, available resources, or a combination thereof. Wireless device 205-a may adapt (e.g., optimize) ACK and/or NACK sequences based on one or more of $\rho_1$, $\rho_2$, and $\rho_3$ and may propagate corresponding sequences to UEs 115 (e.g., UEs 115-a, 115-b, and 115-c). In some examples, wireless device 205-a may propagate the corresponding sequences via RRC signaling.

In some examples, a UE 115 may provide multi-bit feedback in response to receiving one or more data transmissions 210 or messages from wireless device 205-a. For instance, the UE 115 may provide multi-bit feedback in response to a single transmission. For instance, the UE 115 may provide an indication of how close the UE was to receiving and decoding a data transmission 210 such that wireless device 205-a may account for this factor when retransmitting the data transmission 210 to the UE 115. To enable this to occur, wireless device 205-a may assign more than two sequences to the UE 115. Additionally or alternatively, the UE 115 may provide multi-bit feedback in response to multiple transmissions. For instance, the UE 115 may use two bit feedback to indicate an ACK or NACK for two packets. In such examples, the UE 115 may be configured with four sequences to account for four ACK and/or NACK combinations. In some examples, wireless device 205-a may configure whether or not a UE 115 is to support multi-bit feedbacks per packet and/or multi-bit feedback for multiple packets. Additionally, wireless device 205-a may configure a sequence assignment, a number of bits, and a number of packets at each UE 115. In some examples, wireless device 205-a may configure each UE 115 of the set of UEs 115 separately or may broadcast the same configuration information to each UE 115.

In some examples, supporting NACK sequences that are non-orthogonal with each other, ACK sequences that are non-orthogonal with each other, ACK sequences that are non-orthogonal with NACK sequences, or any combination thereof may have one or more advantages. For instance, using non-orthogonal sequences may support a lower number of DoF for ACK sequences and/or NACK sequences. A lower number of DoF may enable feedback 215 to be conveyed over a fewer number of RBs. Accordingly, wireless communications systems 200 that use non-orthogonal sequences to convey feedback 215 may have more RBs available to communicate transmissions other than feedback 215. Additionally or alternatively, wireless device 205-a may use the RBs freed up by the methods described herein to schedule communications for one or more UEs 115 of the set of UEs 115 or other devices.

Figure 3:
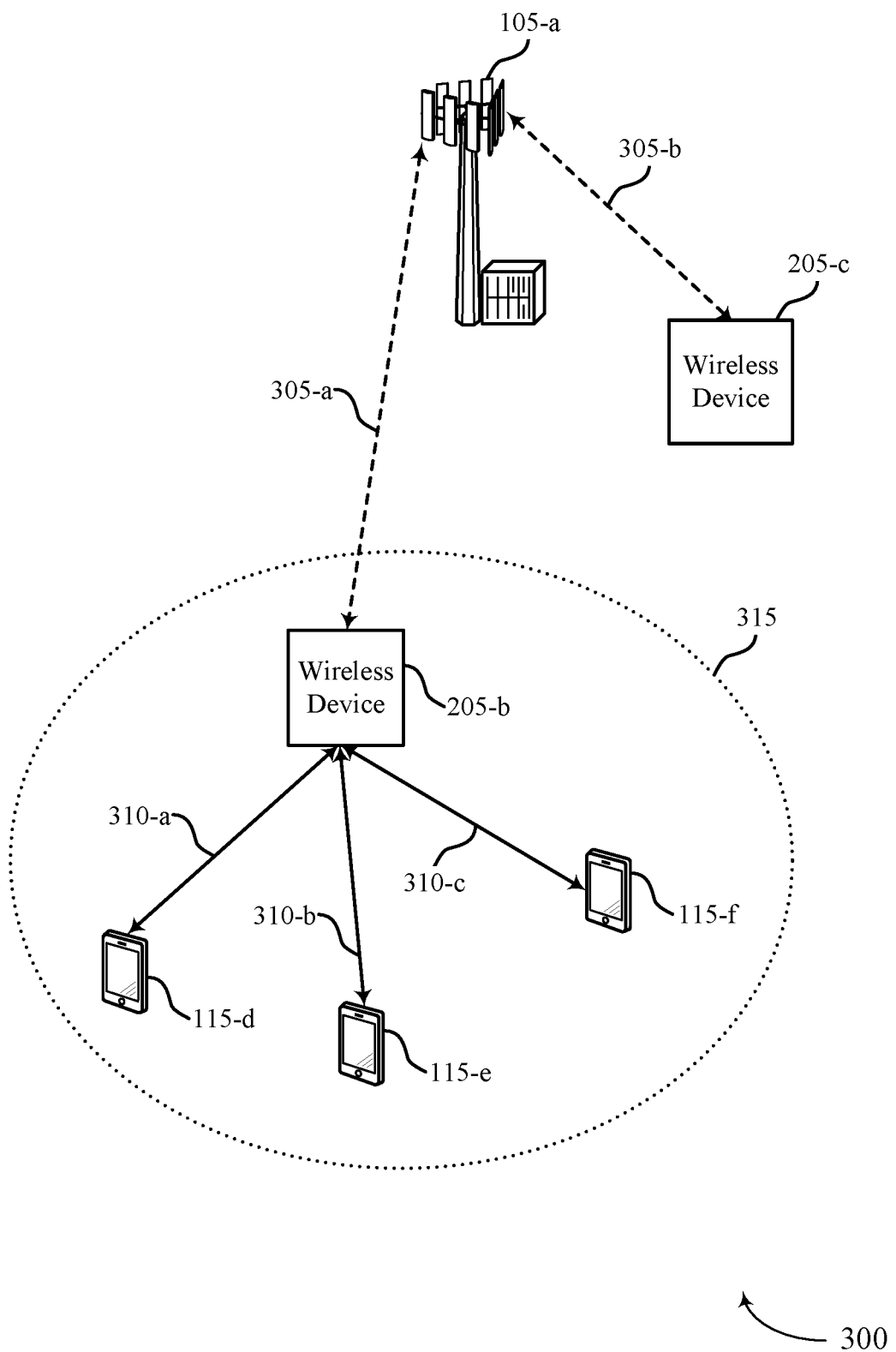
FIG. 3 illustrates an example of a wireless communications system that supports soft multiplexing of feedback in accordance with aspects of the present disclosure.

FIG. 3 illustrates an example of a wireless communications system 300 that supports soft multiplexing of feedback in accordance with aspects of the present disclosure. In some examples, wireless communications system 300 may be implemented by one or more aspects of wireless communications systems 100 and/or 200. For instance, UEs 115-*d*, 115-*e*, and 115-*f* may be examples of UEs 115 as described with reference to FIG. 1; base station 105-*a* may be an example of a base station 105 as described with reference to FIG. 1; and wireless devices 205-*b* and 205-*c* may each be an example of a wireless device 205-*a* as described with reference to FIG. 2, a base station 105 as described with reference to FIG. 1, or a UE 115 as described with reference to FIG. 1.

Base station 105-*a* may communicate with wireless device 205-*b* via communication link 305-*a* and may communicate with wireless device 205-*c* via communication link 305-*b*. Wireless device 205-*b* may communicate with UE 115-*d* via communication link 310-*a*, may communicate with UE 115-*e* via communication link 310-*b*, and may communicate with UE 115-*f* via communication link 310-*c*. UEs 115-*d*, 115-*e*, and 115-*f* may be within a coverage area 315 of wireless device 205-*b*. In some examples, each of UEs 115-*d*, 115-*e*, and 115-*f* may be an example of a sensor, an actuator, or both.

In some examples, one or more of UEs 115-*d*, 115-*e*, and 115-*f* may provide a hybrid automatic repeat request (HARQ) ACK/NACK (A/N) report to wireless device 205-*b*. The feedback may be communicate using orthogonal resources for each UE 115 reporting A/N feedback. In some examples, each UE 115 may have a respective one resource block (RB) over which the UE 115 communicates the feedback. In examples in which wireless device 205-*b* is a UE 115, wireless device 205-*b* may communicate with base station 105-*a* via a physical uplink control channel (PUCCH).

In some examples, wireless device 205-*b* may perform a HARQ feedback-based retransmission. For instance, base station 105-*a* may schedule data transmissions that wireless device 205-*b* is to transmit to UEs 115-*d*, 115-*e*, and 115-*f*. Accordingly, wireless device 205-*b* may transmit a respective one or more data transmissions of the scheduled data transmissions to each of UEs 115-*d*, 115-*e*, and 115-*f*. UEs 115-*d*, 115-*e*, and 115-*f* may transmit HARQ A/N feedback back to wireless device 205-*b* and wireless device 205-*b* may retransmit the data transmissions for which a NACK was indicated. However, in some examples, wireless device 205-*b* may support up to X retransmissions (e.g., due to resource provision and latency bound, for industrial Internet of Things (IIoT) or ultra-reliable low-latency communications (URLLC) transmissions). Accordingly, wireless device 205-*b* may support X retransmissions following Y first transmissions.

In examples in which X retransmissions are supported and X<Y, orthogonalizing each HARQ A/N report may not be as efficient (e.g., may be associated with using more communications resources, such as resource blocks) than other methods. For instance, soft multiplexing at least some of the HARQ A/N reports may enable feedback to be conveyed with increase efficiency (e.g., with fewer resource blocks). Soft multiplexing may involve decreasing the DoF associated with reporting NACK feedback and/or using sequences for NACK feedback that are non-orthogonal with each other. By decreasing the DoF and/or using non-orthogonal sequences, HARQ A/N reports may be conveyed to wireless device 205-*b* over fewer resources (e.g., fewer resource blocks).

Figure 4:
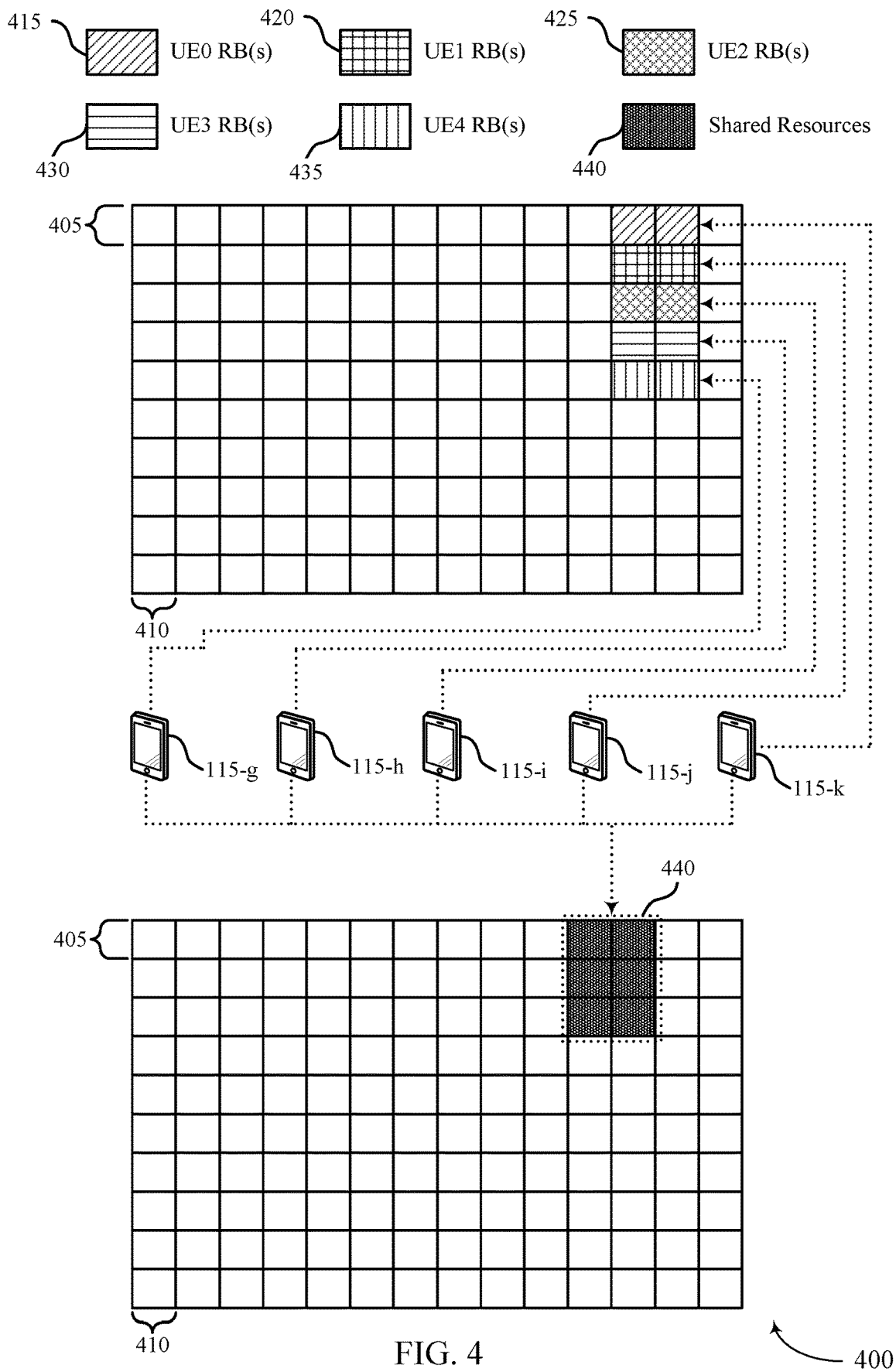
FIG. 4 illustrates an example of a resource sharing scheme that supports soft multiplexing of feedback in accordance with aspects of the present disclosure.

FIG. 4 illustrates an example of a resource sharing scheme 400 that supports soft multiplexing of feedback in accordance with aspects of the present disclosure. In some examples, resource sharing scheme 400 may be implemented by one or more aspects of wireless communications systems 100 and/or 200. For instance, UEs 115-*g*, 115-*h*, 115-*i*, 115-*j*, and 115-*k* may be examples of UEs 115 as described with reference to FIG. 1.

In some examples, a wireless device (e.g., a wireless device 205-*a* as described with reference to FIG. 2 and/or a wireless device 205-*b* as described with reference to FIG. 3) may communicate with a set of UEs 115 (e.g., UEs 115-*g*, 115-*h*, 115-*i*, 115-*j*, and 115-*k*). The wireless device may transmit a first transmission (e.g., a data transmission) to each UE 115 of the set of UEs 115. Based on HARQ, the wireless device may support up to X retransmissions (e.g., 3 retransmissions) within a latency bound and resources for the X retransmissions may be provisioned with a latency bound.

In a first example, UEs 115-*g*, 115-*h*, 115-*i*, 115-*j*, and 115-*k* may provide ACK and/or NACK feedback (e.g., in response to the first transmissions) over resources 415, 420, 425, 430, and 435, respectively. Each of resources 415, 420, 425, 430, and 435 may span a different frequency unit 405 (e.g., subcarrier, resource block) and may span one or more same time units 410 (e.g., symbols).

In a second example, UEs 115-*g*, 115-*h*, 115-*i*, 115-*j*, and 115-*k* may provide ACK and/or NACK feedback (e.g., in response to the first transmissions) over shared resources 440. In some examples, at least some A/N codewords may be multiplexed non-orthogonally within shared resources 440 (e.g., a shared resource pool). Shared resources 440 may have fewer resource blocks than the combined sum of resources 415, 420, 425, 430, and 435. In some examples, a probability that more than X NACKs may be conveyed over shared resources 440 may be lower than a threshold amount.

Figure 5:
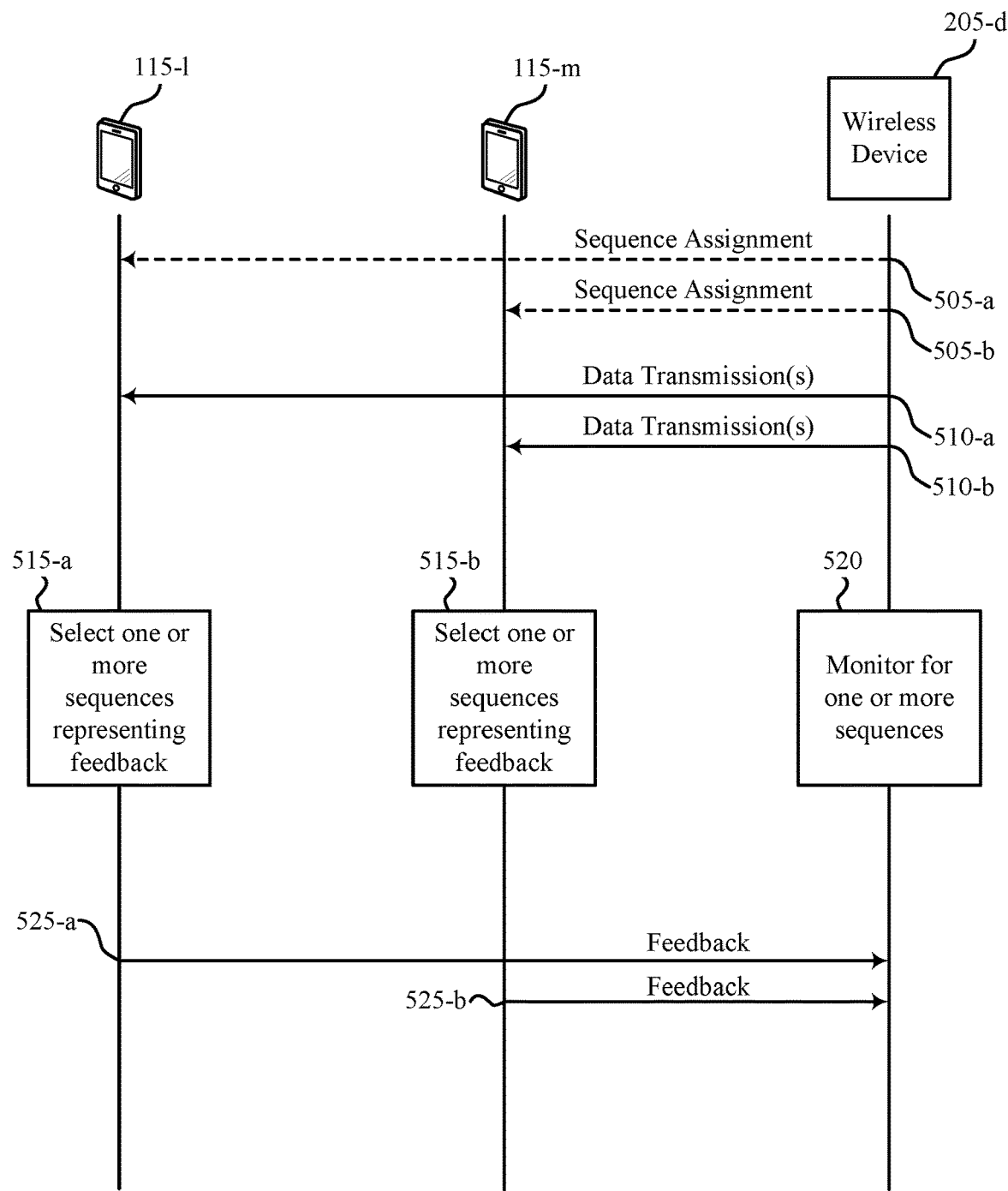
FIG. 5 illustrates an example of a process flow that supports soft multiplexing of feedback in accordance with aspects of the present disclosure.

FIG. 5 illustrates an example of a process flow 500 that supports soft multiplexing of feedback in accordance with aspects of the present disclosure. In some examples, process flow 500 may be implemented by one or more aspects of wireless communications system 100 and/or 200. For instance, UEs 115-*l* and 115-*m* may be examples of UEs 115 as described with reference to FIG. 1 and wireless device 205-*d* may be an example of a wireless device 205-*a* as described with reference to FIG. 2.

At 505-*a*, wireless device 205-*d* may transmit, to UE 115-*l*, an assignment of a respective first sequence of a first set of sequences and a respective second sequence of a second set of sequences, where the first set of sequences represents acknowledgement feedback and the second set of sequences represents negative acknowledgement feedback. At 505-*b*, wireless device 205-*d* may transmit, to UE 115-*m*, an assignment of a respective second sequence of the first set of sequences and a respective second sequence of the second set of sequences At 510-*a*, wireless device 205-*d* may transmit one or more data messages to UE 115-*l*. At 510-*b* wireless device 205-*d* may transmit one or more data messages to UE 115-*m*. The one or more respective data messages transmitted to each of UE 115-*l* and UE 115-*m* may be of a set of data transmitted from wireless device 205-*d* to a set of UEs 115 (e.g., at set of UEs 115 including UEs 115-*l* and 115-*m*).

At 515-*a*, UE 115-*l* may select a sequence representing feedback associated with the one or more data messages, the sequence being selected from a sequence pool, individual sequences of at least the second set of sequences being non-orthogonal to each other. At 515-*b*, UE 115-*m* may select a sequence representing feedback associated with one or more data messages, the sequence being selected from the sequence pool. In some examples, individual sequences of the first set of sequences may be orthogonal with each other, and each sequence of the first set of sequences may be orthogonal with each sequence of the second set of sequences. Alternatively, individual sequences of the first set of sequences may be orthogonal with each other, and each sequence of the first set of sequences may be non-orthogonal with each sequence of the second set of sequences. Alternatively, individual sequences of the first set of sequences may be non-orthogonal with each other, and each sequence of the first set of sequences may be orthogonal with each sequence of the second set of sequences. Alternatively, individual sequences of the first set of sequences may be non-orthogonal with each other, where each sequence of the first set of sequences is non-orthogonal with each sequence of the second set of sequences. In some examples, the selected sequence may include one of the respective first sequence or the respective second sequence (e.g., indicated at 505-a or 505-b).

At 520, wireless device 205-d may monitor a shared set of time and frequency resources for the sequence from each UE 115 of the set of UEs 115 (e.g., UE 115-l, UE 115-m). The shared set of time and frequency resources may be shared for feedback messages from the set of UEs 115.

At 525-a, UE 115-l may transmit, to wireless device 205-d, the selected sequence via the shared set of time and frequency resources. At 525-b, UE 115-m may transmit, to wireless device 205-d, the selected sequence via the shared set of time and frequency resources. In some examples, transmitting the selected sequence to wireless device 105-d may include transmitting the sequence via a resource block of the shared set of time and frequency resources, where a total number of resource blocks associated with the shared set of time and frequency resources may be less than a total number of UEs 115 of the set of UEs 115.

In some examples, the one or more data messages may include a first data message and the sequence may represent feedback for the first data message. In some such examples, UE 115-l and/or UE 115-m may select an additional sequence representing feedback for the first data message, the additional sequence selected from the sequence pool and may transmit the additional sequence to wireless device 205-d via the shared set of time and frequency resources. Additionally or alternatively, the one or more data messages may include a first data message and a second data message and the sequence may represent feedback for the first data message. In some such examples, UE 115-l and/or UE 115-m may select an additional sequence representing feedback for the second data message, the additional sequence selected from the sequence pool, and may transmit the additional sequence to wireless device 105-d via the shared set of time and frequency resources. In some examples, wireless device 205-d may transmit, to UE 115-l and/or UE 115-m, an indication for UE 115-l and/or UE 115-m to select at least two sequences for the respective one or more data messages. UE 115-l and/or UE 115-m may select an additional sequence representing feedback for the one or more data messages based on receiving the indication and may transmit the additional sequence to wireless device 205-d via the shared set of time and frequency resources.

In some examples, a total number of degrees of freedom between sequences of the second set of sequences may be less than a total number of degrees of freedom between sequences of the first set of sequences. In some examples, wireless device 205-d may be a UE 115 (e.g., a UE 115 excluded from the set of UEs 115). In some such examples, the sequence may be transmitted via a sidelink shared channel (e.g., a PSSCH). In some examples, wireless device 205-d may be a base station 105. In some such examples, the sequence may be transmitted via an uplink shared channel (e.g., a PUSCH). In some examples, a total number of degrees of freedom between sequences of the second set of sequences is associated with a retransmission capability of the wireless device. In some examples, the individual sequences of at least the second set of sequences may be orthogonal to each other based on the total number of degrees of freedom being below a threshold.

Figure 6:
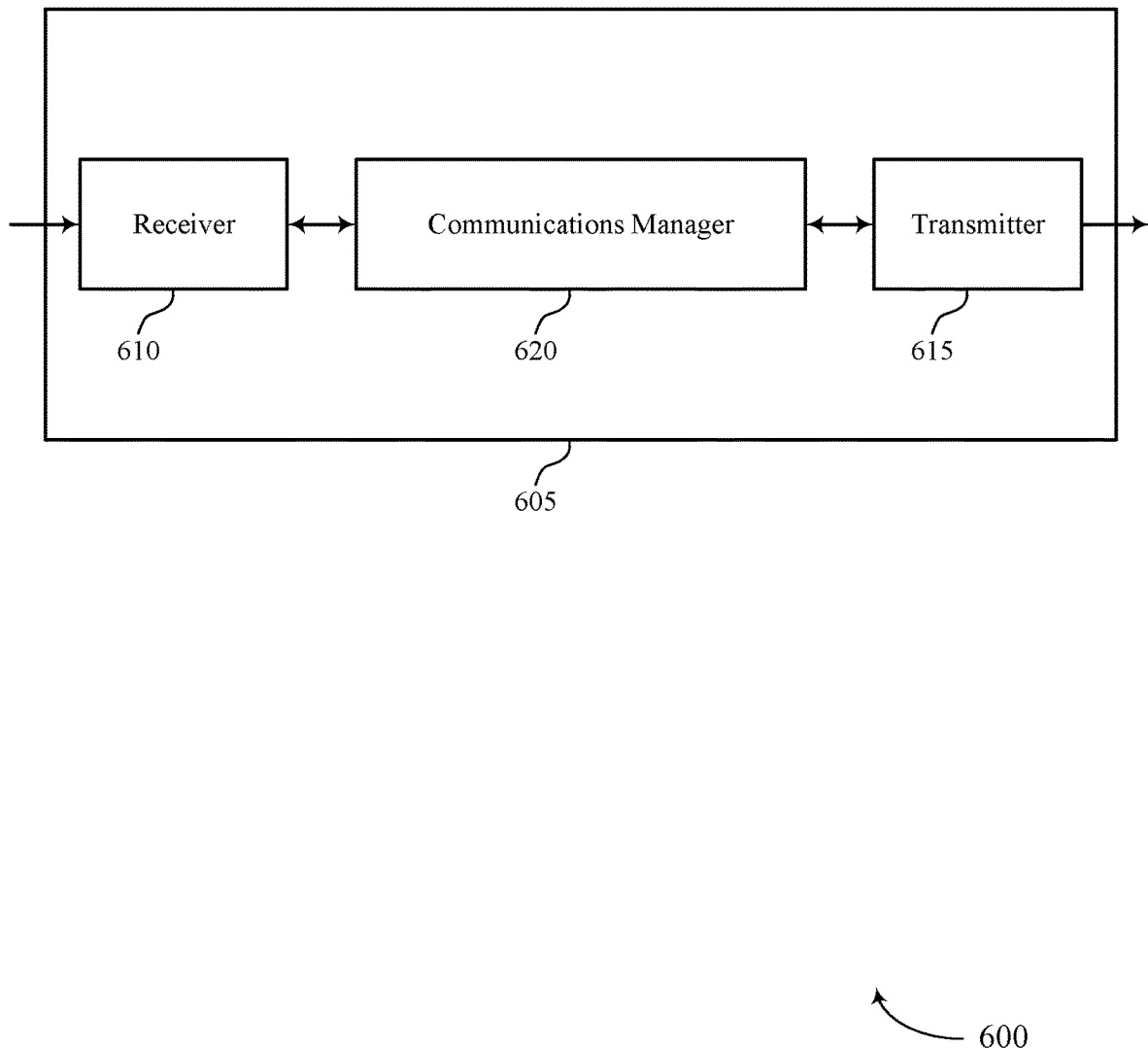
FIGS. 6 and 7 show block diagrams of devices that support soft multiplexing of feedback in accordance with aspects of the present disclosure.

FIG. 6 shows a block diagram 600 of a device 605 that supports soft multiplexing of feedback in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to soft multiplexing of feedback). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to soft multiplexing of feedback). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of soft multiplexing of feedback as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving one or more data messages from a wireless device, the one or more data messages being of a set of multiple data messages transmitted from the wireless device to a set of multiple UEs. The communications manager 620 may be configured as or otherwise support a means for selecting a sequence representing feedback associated with the one or more data messages, the sequence being selected from a sequence pool that includes a first set of multiple sequences representing acknowledgment feedback and a second set of multiple sequences representing negative acknowledgment feedback, individual sequences of at least the second set of multiple sequences being non-orthogonal to each other. The communications manager 620 may be configured as or otherwise support a means for transmitting the sequence to the wireless device via a shared set of time and frequency resources, the shared set of time and frequency resources being shared for feedback messages from the set of multiple UEs.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for a wireless device to communicate with a set of UEs 115 over a fewer number of resource blocks. For instance, by using a shared set of time and frequency resources, the number of resource blocks used to convey feedback may be reduced. Using fewer resource blocks for feedback may enable more resource blocks to be used for other types of communication. Additionally, using a shared set of time and frequency resources may enable more feedback to be conveyed over a same number of resource blocks.

Figure 7:
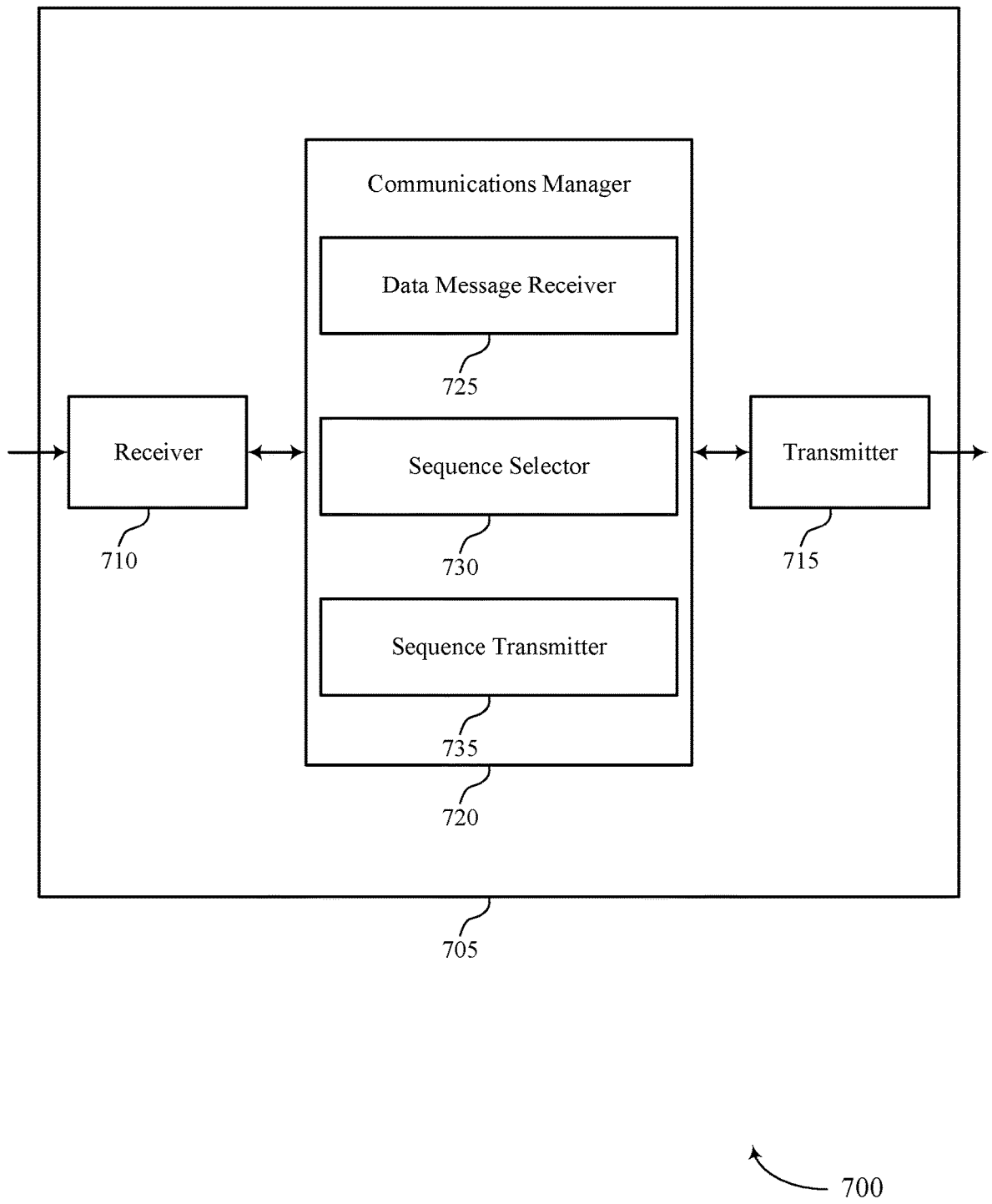

FIG. 7 shows a block diagram 700 of a device 705 that supports soft multiplexing of feedback in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to soft multiplexing of feedback). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to soft multiplexing of feedback). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of soft multiplexing of feedback as described herein. For example, the communications manager 720 may include a data message receiver 725, a sequence selector 730, a sequence transmitter 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The data message receiver 725 may be configured as or otherwise support a means for receiving one or more data messages from a wireless device, the one or more data messages being of a set of multiple data messages transmitted from the wireless device to a set of multiple UEs. The sequence selector 730 may be configured as or otherwise support a means for selecting a sequence representing feedback associated with the one or more data messages, the sequence being selected from a sequence pool that includes a first set of multiple sequences representing acknowledgment feedback and a second set of multiple sequences representing negative acknowledgment feedback, individual sequences of at least the second set of multiple sequences being non-orthogonal to each other. The sequence transmitter 735 may be configured as or otherwise support a means for transmitting the sequence to the wireless device via a shared set of time and frequency resources, the shared set of time and frequency resources being shared for feedback messages from the set of multiple UEs.

Figure 8:
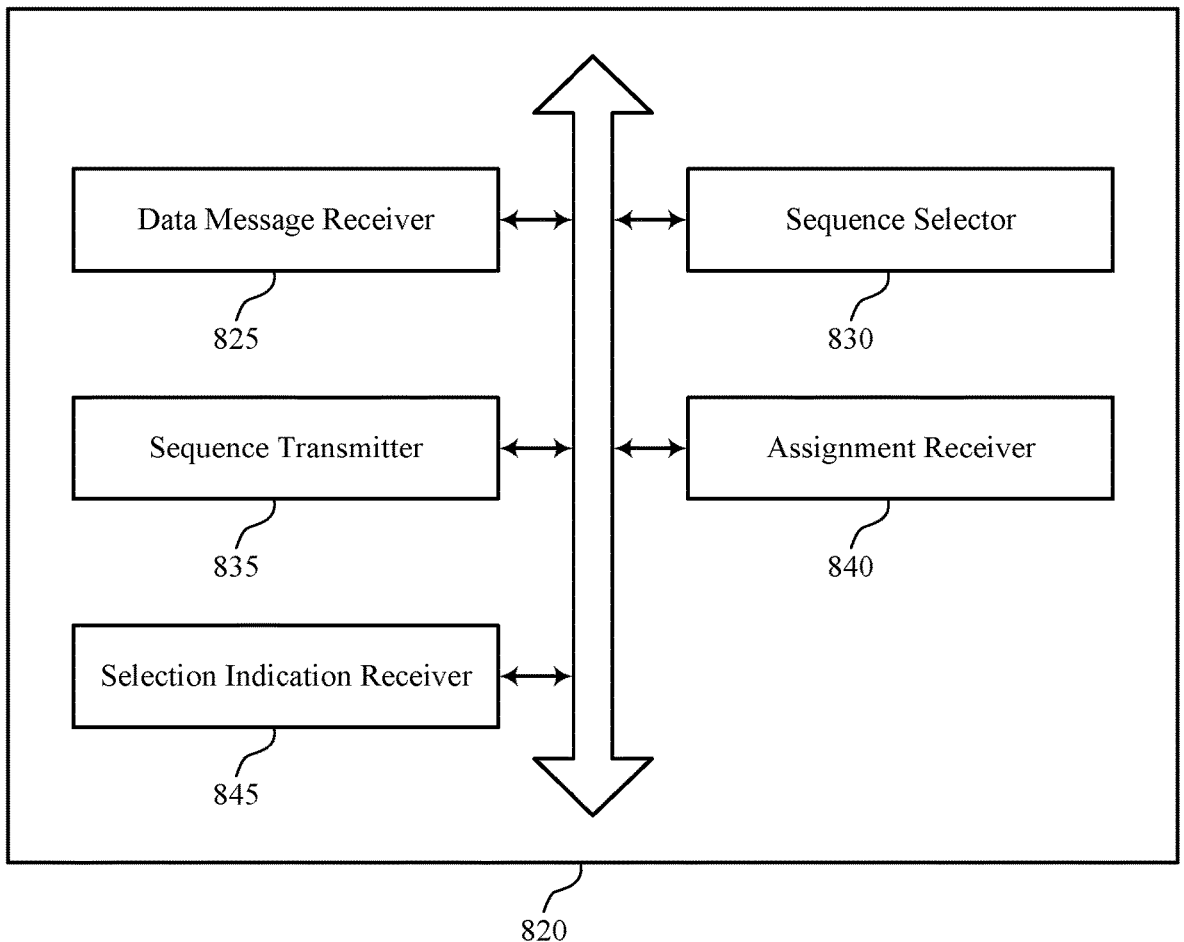
FIG. 8 shows a block diagram of a communications manager that supports soft multiplexing of feedback in accordance with aspects of the present disclosure.

FIG. 8 shows a block diagram 800 of a communications manager 820 that supports soft multiplexing of feedback in accordance with aspects of the present disclosure. The communications manager 820 may be an example of aspects of a communications manager 620, a communications manager 720, or both, as described herein. The communications manager 820, or various components thereof, may be an example of means for performing various aspects of soft multiplexing of feedback as described herein. For example, the communications manager 820 may include a data message receiver 825, a sequence selector 830, a sequence transmitter 835, an assignment receiver 840, a selection indication receiver 845, or any combination thereof. Each of these components may communicate, directly or indirectly, with one another (e.g., via one or more buses).

The communications manager 820 may support wireless communication at a UE in accordance with examples as disclosed herein. The data message receiver 825 may be configured as or otherwise support a means for receiving one or more data messages from a wireless device, the one or more data messages being of a set of multiple data messages transmitted from the wireless device to a set of multiple UEs. The sequence selector 830 may be configured as or otherwise support a means for selecting a sequence representing feedback associated with the one or more data messages, the sequence being selected from a sequence pool that includes a first set of multiple sequences representing acknowledgment feedback and a second set of multiple sequences representing negative acknowledgment feedback, individual sequences of at least the second set of multiple sequences being non-orthogonal to each other. The sequence transmitter 835 may be configured as or otherwise support a means for transmitting the sequence to the wireless device via a shared set of time and frequency resources, the shared set of time and frequency resources being shared for feedback messages from the set of multiple UEs.

In some examples, to support selecting the sequence, the sequence selector 830 may be configured as or otherwise support a means for selecting the sequence from the sequence pool, where individual sequences of the first set of multiple sequences of the sequence pool are orthogonal with each other, and where each sequence of the first set of multiple sequences is orthogonal with each sequence of the second set of multiple sequences.

In some examples, to support selecting the sequence, the sequence selector 830 may be configured as or otherwise support a means for selecting the sequence from the sequence pool, where individual sequences of the first set of multiple sequences of the sequence pool are orthogonal with each other, and where each sequence of the first set of multiple sequences is non-orthogonal with each sequence of the second set of multiple sequences.

In some examples, to support selecting the sequence, the sequence selector 830 may be configured as or otherwise support a means for selecting the sequence from the sequence pool, where individual sequences of the first set of multiple sequences of the sequence pool are non-orthogonal with each other, and where each sequence of the first set of multiple sequences is orthogonal with each sequence of the second set of multiple sequences.

In some examples, to support selecting the sequence, the sequence selector 830 may be configured as or otherwise support a means for selecting the sequence from the sequence pool, where individual sequences of the first set of multiple sequences of the sequence pool are non-orthogonal with each other, and where each sequence of the first set of multiple sequences is non-orthogonal with each sequence of the second set of multiple sequences.

In some examples, to support transmitting the sequence to the wireless device via the shared set of time and frequency resources, the sequence transmitter 835 may be configured as or otherwise support a means for transmitting the sequence via a resource block of the shared set of time and frequency resources, where a total number of resource blocks associated with the shared set of time and frequency resources is less than a total number of UEs of the set of multiple UEs.

In some examples, the assignment receiver 840 may be configured as or otherwise support a means for receiving, from the wireless device, an assignment of a first sequence of the first set of multiple sequences and a second sequence of the second set of multiple sequences, where the selected sequence includes one of the first sequence or the second sequence.

In some examples, the one or more data messages include a first data message, and the sequence selector 830 may be configured as or otherwise support a means for selecting an additional sequence representing feedback for the first data message, the additional sequence selected from the sequence pool. In some examples, the one or more data messages include a first data message, and the sequence transmitter 835 may be configured as or otherwise support a means for transmitting the additional sequence to the wireless device via the shared set of time and frequency resources.

In some examples, the one or more data messages include a first data message and a second data message, where the sequence represents feedback for the first data message, and the sequence selector 830 may be configured as or otherwise support a means for selecting an additional sequence representing feedback for the second data message, the additional sequence selected from the sequence pool. In some examples, the one or more data messages include a first data message and a second data message, and the sequence transmitter 835 may be configured as or otherwise support a means for transmitting the additional sequence to the wireless device via the shared set of time and frequency resources.

In some examples, the selection indication receiver 845 may be configured as or otherwise support a means for receiving, from the wireless device, an indication for the UE to select at least two sequences for the one or more data messages. In some examples, the sequence selector 830 may be configured as or otherwise support a means for selecting an additional sequence representing feedback for the one or more data messages based on receiving the indication for the UE to select the at least two sequences. In some examples, the sequence transmitter 835 may be configured as or otherwise support a means for transmitting the additional sequence to the wireless device via the shared set of time and frequency resources.

In some examples, a total number of degrees of freedom between sequences of the second set of multiple sequences is less than a total number of degrees of freedom between sequences of the first set of multiple sequences.

In some examples, the wireless device includes a UE excluded from the set of multiple UEs. In some examples, the sequence is transmitted via a sidelink shared channel.

In some examples, the wireless device includes a base station. In some examples, the sequence is transmitted via an uplink shared channel.

In some examples, a total number of degrees of freedom between sequences of the second set of multiple sequences is associated with a retransmission capability of the wireless device.

In some examples, the individual sequences of at least the second set of multiple sequences are non-orthogonal to each other based on the total number of degrees of freedom being below a threshold.

Figure 9:
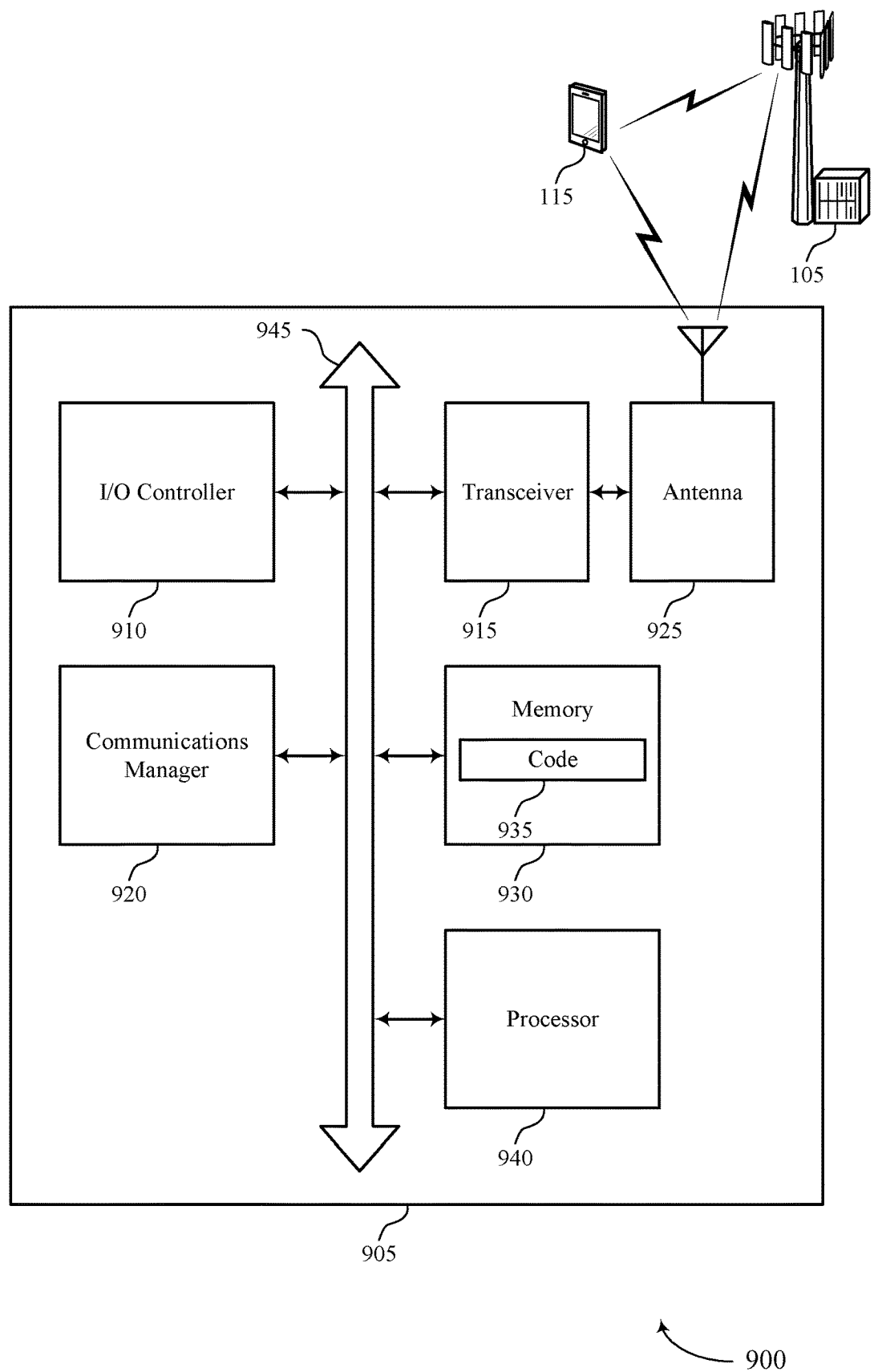
FIG. 9 shows a diagram of a system including a device that supports soft multiplexing of feedback in accordance with aspects of the present disclosure.

FIG. 9 shows a diagram of a system 900 including a device 905 that supports soft multiplexing of feedback in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting soft multiplexing of feedback). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving one or more data messages from a wireless device, the one or more data messages being of a set of multiple data messages transmitted from the wireless device to a set of multiple UEs. The communications manager 920 may be configured as or otherwise support a means for selecting a sequence representing feedback associated with the one or more data messages, the sequence being selected from a sequence pool that includes a first set of multiple sequences representing acknowledgment feedback and a second set of multiple sequences representing negative acknowledgment feedback, individual sequences of at least the second set of multiple sequences being non-orthogonal to each other. The communications manager 920 may be configured as or otherwise support a means for transmitting the sequence to the wireless device via a shared set of time and frequency resources, the shared set of time and frequency resources being shared for feedback messages from the set of multiple UEs.

By including or configuring the communications manager 920 in accordance with examples as described herein, the device 905 may support techniques for a wireless device to communicate with a set of UEs 115 over a fewer number of resource blocks. For instance, by using a shared set of time and frequency resources, the number of resource blocks used to convey feedback may be reduced. Using fewer resource blocks for feedback may enable more resource blocks to be used for other types of communication. Additionally, using a shared set of time and frequency resources may enable more feedback to be conveyed over a same number of resource blocks.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of soft multiplexing of feedback as described herein, or the processor 940 and the memory 930 may be otherwise configured to perform or support such operations.

Figure 10:
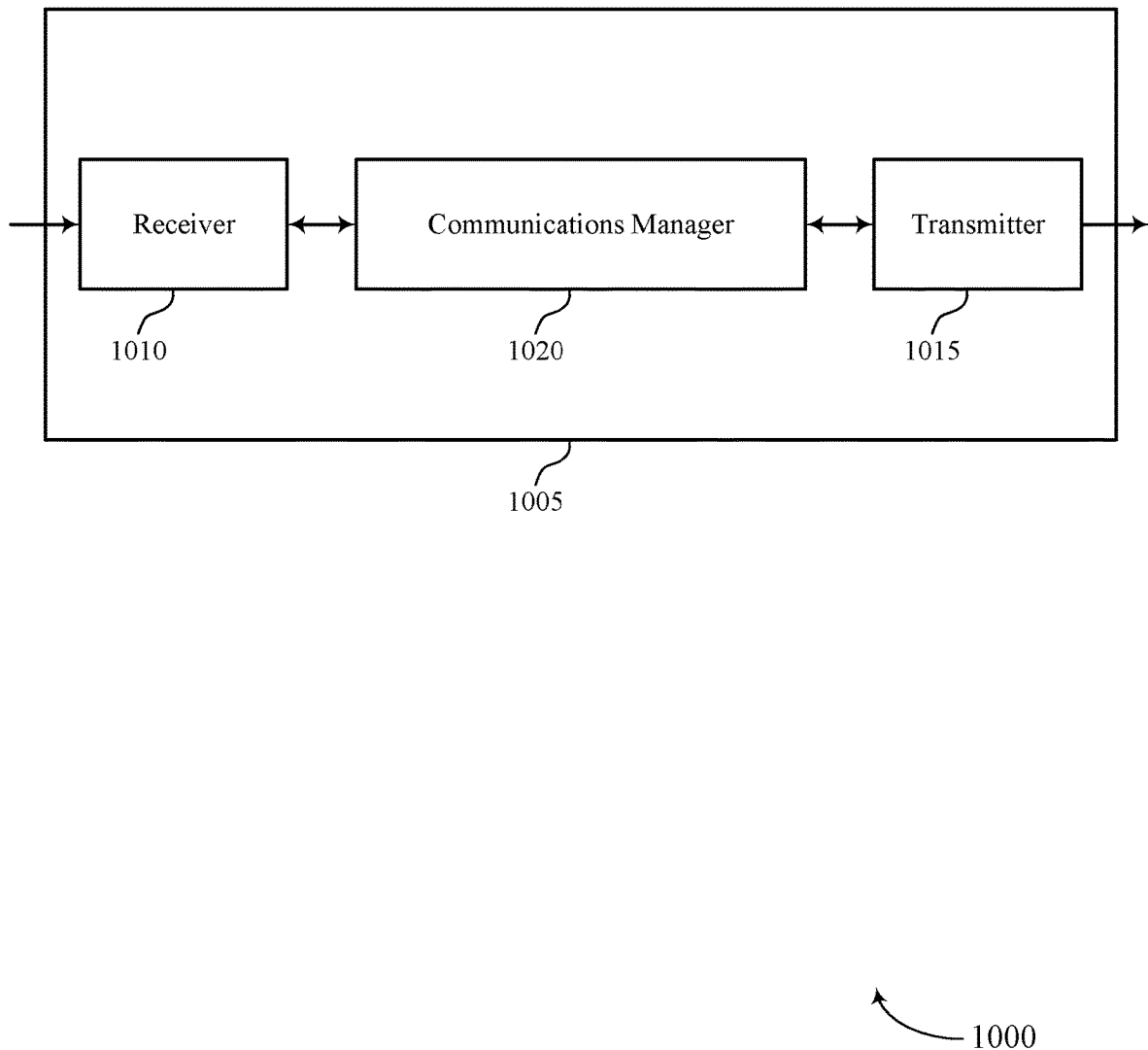
FIGS. 10 and 11 show block diagrams of devices that support soft multiplexing of feedback in accordance with aspects of the present disclosure.

FIG. 10 shows a block diagram 1000 of a device 1005 that supports soft multiplexing of feedback in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to soft multiplexing of feedback). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to soft multiplexing of feedback). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of soft multiplexing of feedback as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a wireless device in accordance with examples as disclosed herein. For example, the communications manager 1020 may be configured as or otherwise support a means for transmitting a set of multiple data messages to a set of multiple user equipments (UEs), the set of multiple data messages including one or more data messages for each UE of the set of multiple UEs. The communications manager 1020 may be configured as or otherwise support a means for monitoring a shared set of time and frequency resources for one or more sequences representing feedback associated with the set of multiple data messages, the one or more sequences being of a sequence pool that includes a first set of multiple sequences representing acknowledgement feedback and a second set of multiple sequences representing negative acknowledgment feedback, individual sequences of at least the second set of multiple sequences being non-orthogonal to each other. The communications manager 1020 may be configured as or otherwise support a means for receiving the one or more sequences based on the monitoring.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for a wireless device to communicate with a set of UEs 115 over a fewer number of resource blocks. For instance, by using a shared set of time and frequency resources, the number of resource blocks used to convey feedback may be reduced. Using fewer resource blocks for feedback may enable more resource blocks to be used for other types of communication. Additionally, using a shared set of time and frequency resources may enable more feedback to be conveyed over a same number of resource blocks.

Figure 11:
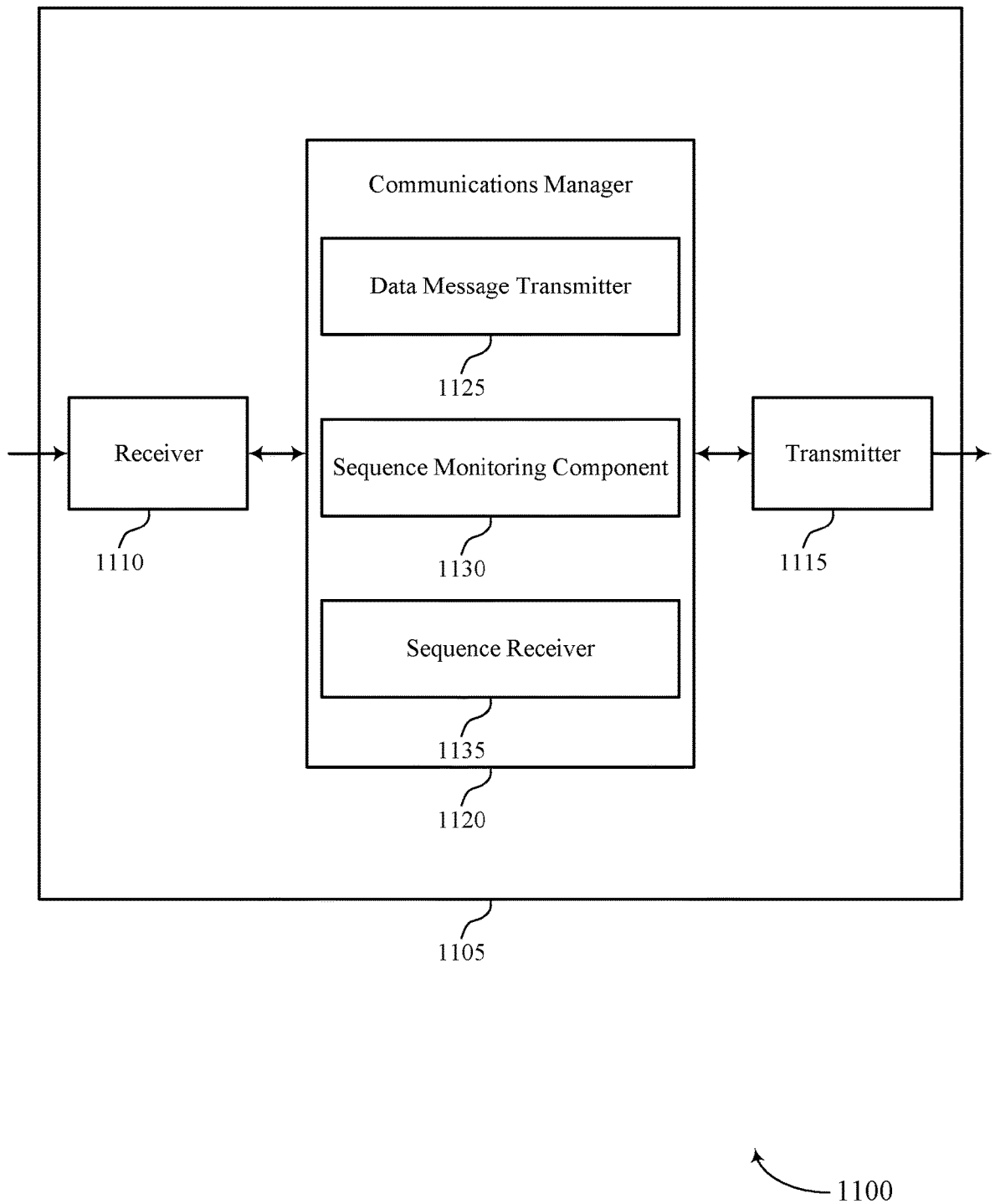

FIG. 11 shows a block diagram 1100 of a device 1105 that supports soft multiplexing of feedback in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to soft multiplexing of feedback). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to soft multiplexing of feedback). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of soft multiplexing of feedback as described herein. For example, the communications manager 1120 may include a data message transmitter 1125, a sequence monitoring component 1130, a sequence receiver 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a wireless device in accordance with examples as disclosed herein. The data message transmitter 1125 may be configured as or otherwise support a means for transmitting a set of multiple data messages to a set of multiple user equipments (UEs), the set of multiple data messages including one or more data messages for each UE of the set of multiple UEs. The sequence monitoring component 1130 may be configured as or otherwise support a means for monitoring a shared set of time and frequency resources for one or more sequences representing feedback associated with the set of multiple data messages, the one or more sequences being of a sequence pool that includes a first set of multiple sequences representing acknowledgement feedback and a second set of multiple sequences representing negative acknowledgment feedback, individual sequences of at least the second set of multiple sequences being non-orthogonal to each other. The sequence receiver 1135 may be configured as or otherwise support a means for receiving the one or more sequences based on the monitoring.

Figure 12:
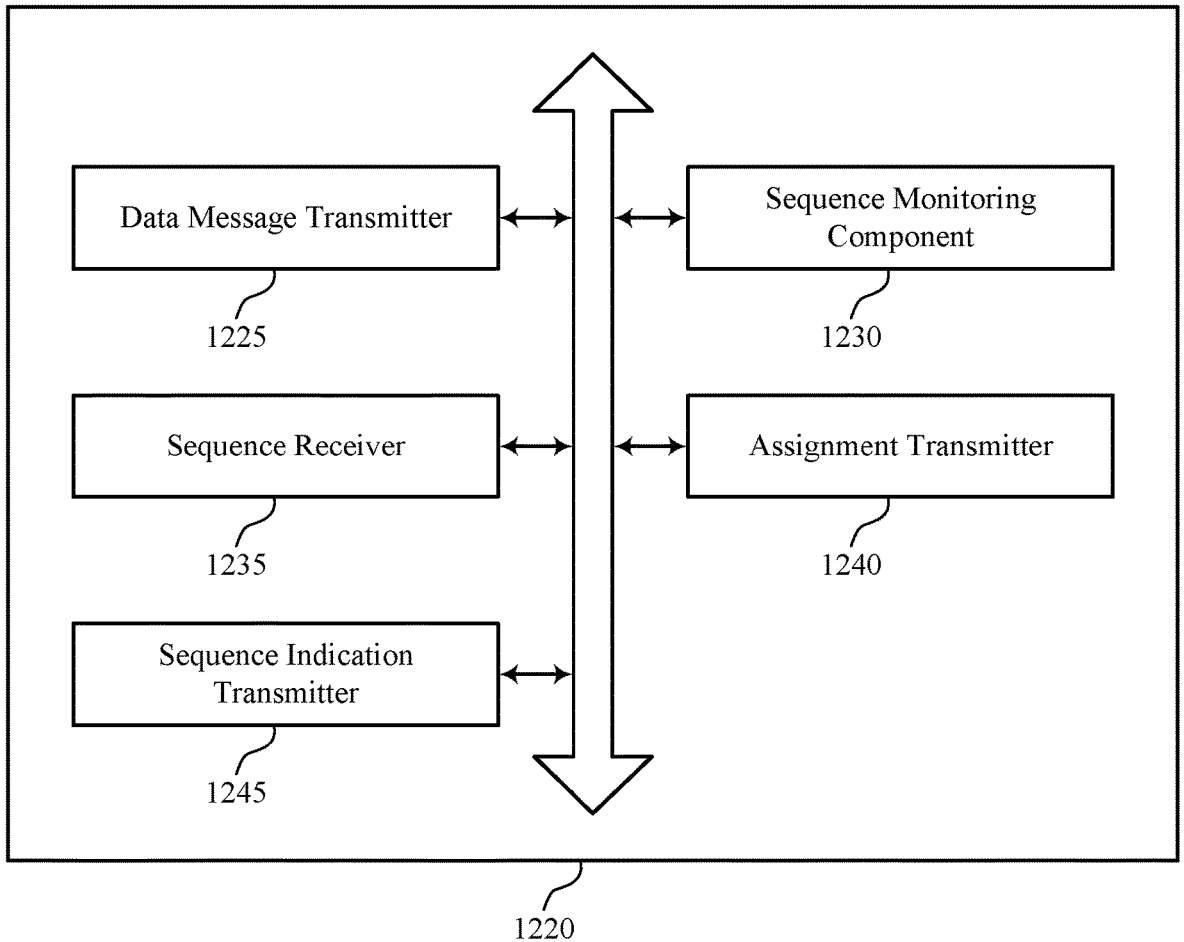
FIG. 12 shows a block diagram of a communications manager that supports soft multiplexing of feedback in accordance with aspects of the present disclosure.

FIG. 12 shows a block diagram 1200 of a communications manager 1220 that supports soft multiplexing of feedback in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of soft multiplexing of feedback as described herein. For example, the communications manager 1220 may include a data message transmitter 1225, a sequence monitoring component 1230, a sequence receiver 1235, an assignment transmitter 1240, a sequence indication transmitter 1245, or any combination thereof. Each of these components may communicate, directly or indirectly, with one another (e.g., via one or more buses).

The communications manager 1220 may support wireless communication at a wireless device in accordance with examples as disclosed herein. The data message transmitter 1225 may be configured as or otherwise support a means for transmitting a set of multiple data messages to a set of multiple user equipments (UEs), the set of multiple data messages including one or more data messages for each UE of the set of multiple UEs. The sequence monitoring component 1230 may be configured as or otherwise support a means for monitoring a shared set of time and frequency resources for one or more sequences representing feedback associated with the set of multiple data messages, the one or more sequences being of a sequence pool that includes a first set of multiple sequences representing acknowledgement feedback and a second set of multiple sequences representing negative acknowledgment feedback, individual sequences of at least the second set of multiple sequences being non-orthogonal to each other. The sequence receiver 1235 may be configured as or otherwise support a means for receiving the one or more sequences based on the monitoring.

In some examples, to support monitoring the shared set of time and frequency resources, the sequence monitoring component 1230 may be configured as or otherwise support a means for monitoring the shared set of time and frequency resources for the one or more sequences, where individual sequences of the first set of multiple sequences of the sequence pool are orthogonal with each other, and where each sequence of the first set of multiple sequences is orthogonal with each sequence of the second set of multiple sequences.

In some examples, to support monitoring the shared set of time and frequency resources, the sequence monitoring component 1230 may be configured as or otherwise support a means for monitoring the shared set of time and frequency resources for the one or more sequences, where individual sequences of the first set of multiple sequences of the sequence pool are orthogonal with each other, and where each sequence of the first set of multiple sequences is non-orthogonal with each sequence of the second set of multiple sequences.

In some examples, to support monitoring the shared set of time and frequency resources, the sequence monitoring component 1230 may be configured as or otherwise support a means for monitoring the shared set of time and frequency resources for the one or more sequences, where individual sequences of the first set of multiple sequences of the sequence pool are non-orthogonal with each other, and where each sequence of the first set of multiple sequences is orthogonal with each sequence of the second set of multiple sequences.

In some examples, to support monitoring the shared set of time and frequency resources, the sequence monitoring component 1230 may be configured as or otherwise support a means for monitoring the shared set of time and frequency resources for the one or more sequences, where individual sequences of the first set of multiple sequences of the sequence pool are non-orthogonal with each other, and where each sequence of the first set of multiple sequences is non-orthogonal with each sequence of the second set of multiple sequences.

In some examples, to support receiving the one or more sequences, the sequence receiver 1235 may be configured as or otherwise support a means for receiving at least one sequence of the one or more sequences via a resource block of the shared set of time and frequency resources, where a total number of resource blocks associated with the shared set of time and frequency resources is less than a total number of UEs of the set of multiple UEs.

In some examples, the assignment transmitter 1240 may be configured as or otherwise support a means for transmitting, to each UE of the set of multiple UEs, an assignment of a respective first sequence of the first set of multiple sequences and a respective second sequence of the second set of multiple sequences, where the one or more sequences includes one of the respective first sequence and the respective second sequence for each UE of the set of multiple UEs.

In some examples, the one or more data messages for a UE of the set of multiple UEs include a first data message, and the sequence monitoring component 1230 may be configured as or otherwise support a means for monitoring the shared set of time and frequency resources for a first sequence of the one or more sequences representing feedback for the first data message and a second sequence of the one or more sequences representing feedback for the first data message, the first sequence and the second sequence selected from the sequence pool. In some examples, the one or more data messages for a UE of the set of multiple UEs include a first data message, and the sequence receiver 1235 may be configured as or otherwise support a means for receiving, from the UE of the set of multiple UEs, the first sequence and the second sequence.

In some examples, the one or more data messages for a UE of the set of multiple UEs include a first data message and a second data message, and the sequence monitoring component 1230 may be configured as or otherwise support a means for monitoring the shared set of time and frequency resources for a first sequence of the one or more sequences representing feedback for the first data message and a second sequence of the one or more sequences representing feedback for the second data message, the first sequence and the second sequence selected from the sequence pool. In some examples, the one or more data messages for a UE of the set of multiple UEs include a first data message and a second data message, and the sequence receiver 1235 may be configured as or otherwise support a means for receiving, from the UE of the set of multiple UEs, the first sequence and the second sequence.

In some examples, the sequence indication transmitter 1245 may be configured as or otherwise support a means for transmitting, to a UE of the set of multiple UEs, an indication for the UE to select at least two sequences for the one or more data messages for the UE. In some examples, the sequence monitoring component 1230 may be configured as or otherwise support a means for monitoring the shared set of time and frequency resources for a first sequence representing feedback for the one or more data messages for the UE and a second sequence representing feedback for the one or more data messages for the UE based on transmitting the indication for the UE to select the at least two sequences. In some examples, the sequence receiver 1235 may be configured as or otherwise support a means for receiving, from the UE of the set of multiple UEs, the first sequence and the second sequence.

In some examples, a total number of degrees of freedom between sequences of the second set of multiple sequences is less than a total number of degrees of freedom between sequences of the first set of multiple sequences.

In some examples, the wireless device includes a UE excluded from the set of multiple UEs. In some examples, each of the one or more sequences is received via a respective sidelink shared channel.

In some examples, the wireless device includes a base station. In some examples, the each of the one or more sequences is received via a respective uplink shared channel.

In some examples, a total number of degrees of freedom between sequences of the second set of multiple sequences is associated with a retransmission capability of the wireless device.

In some examples, the individual sequences of at least the second set of multiple sequences are non-orthogonal to each other based on the total number of degrees of freedom being below a threshold.

Figure 13:
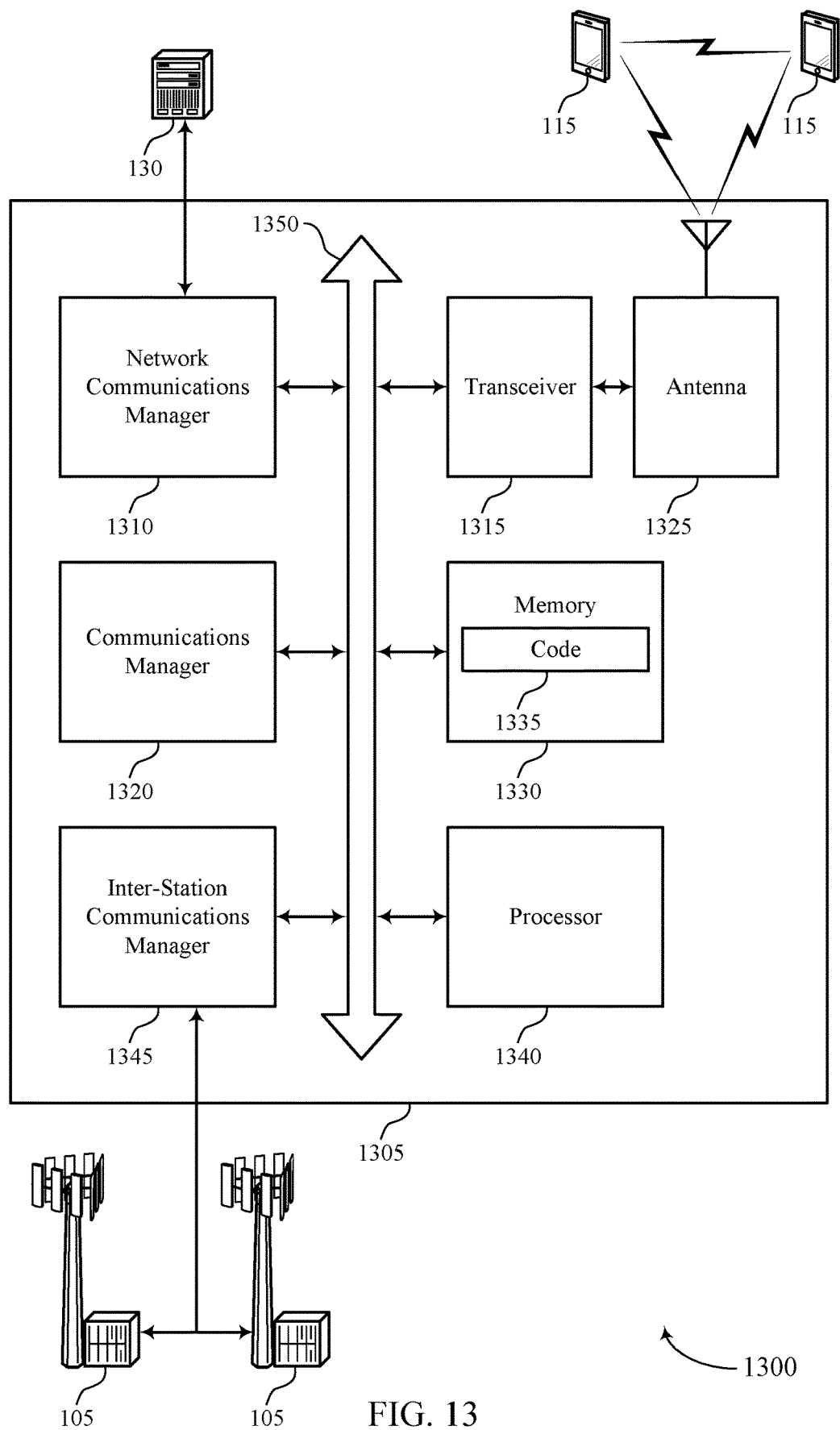
FIG. 13 shows a diagram of a system including a device that supports soft multiplexing of feedback in accordance with aspects of the present disclosure.

FIG. 13 shows a diagram of a system 1300 including a device 1305 that supports soft multiplexing of feedback in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting soft multiplexing of feedback). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a wireless device in accordance with examples as disclosed herein. For example, the communications manager 1320 may be configured as or otherwise support a means for transmitting a set of multiple data messages to a set of multiple user equipments (UEs), the set of multiple data messages including one or more data messages for each UE of the set of multiple UEs. The communications manager 1320 may be configured as or otherwise support a means for monitoring a shared set of time and frequency resources for one or more sequences representing feedback associated with the set of multiple data messages, the one or more sequences being of a sequence pool that includes a first set of multiple sequences representing acknowledgement feedback and a second set of multiple sequences representing negative acknowledgment feedback, individual sequences of at least the second set of multiple sequences being non-orthogonal to each other. The communications manager 1320 may be configured as or otherwise support a means for receiving the one or more sequences based on the monitoring.

By including or configuring the communications manager 1320 in accordance with examples as described herein, the device 1305 may support techniques for a wireless device to communicate with a set of UEs 115 over a fewer number of resource blocks. For instance, by using a shared set of time and frequency resources, the number of resource blocks used to convey feedback may be reduced. Using fewer resource blocks for feedback may enable more resource blocks to be used for other types of communication. Additionally, using a shared set of time and frequency resources may enable more feedback to be conveyed over a same number of resource blocks.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of soft multiplexing of feedback as described herein, or the processor 1340 and the memory 1330 may be otherwise configured to perform or support such operations.

Figure 14:
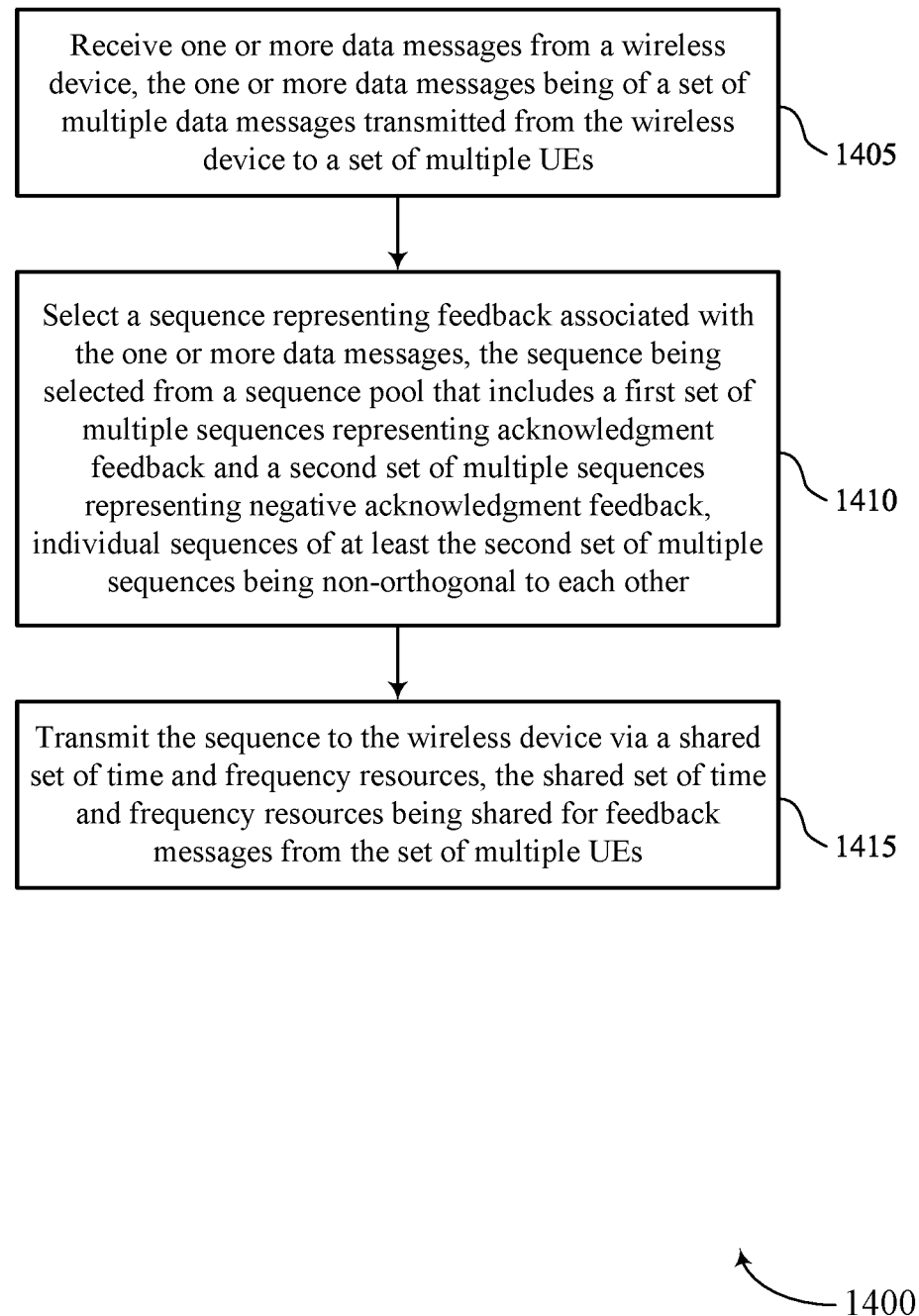
FIGS. 14 through 17 show flowcharts illustrating methods that support soft multiplexing of feedback in accordance with aspects of the present disclosure.

FIG. 14 shows a flowchart illustrating a method 1400 that supports soft multiplexing of feedback in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving one or more data messages from a wireless device, the one or more data messages being of a set of multiple data messages transmitted from the wireless device to a set of multiple UEs. The operations of 1405 may be performed in accordance with examples as disclosed herein. In some examples, aspects of the operations of 1405 may be performed by a data message receiver 825 as described with reference to FIG. 8.

At 1410, the method may include selecting a sequence representing feedback associated with the one or more data messages, the sequence being selected from a sequence pool that includes a first set of multiple sequences representing acknowledgment feedback and a second set of multiple sequences representing negative acknowledgment feedback, individual sequences of at least the second set of multiple sequences being non-orthogonal to each other. The operations of 1410 may be performed in accordance with examples as disclosed herein. In some examples, aspects of the operations of 1410 may be performed by a sequence selector 830 as described with reference to FIG. 8.

At 1415, the method may include transmitting the sequence to the wireless device via a shared set of time and frequency resources, the shared set of time and frequency resources being shared for feedback messages from the set of multiple UEs. The operations of 1415 may be performed in accordance with examples as disclosed herein. In some examples, aspects of the operations of 1415 may be performed by a sequence transmitter 835 as described with reference to FIG. 8.

Figure 15:
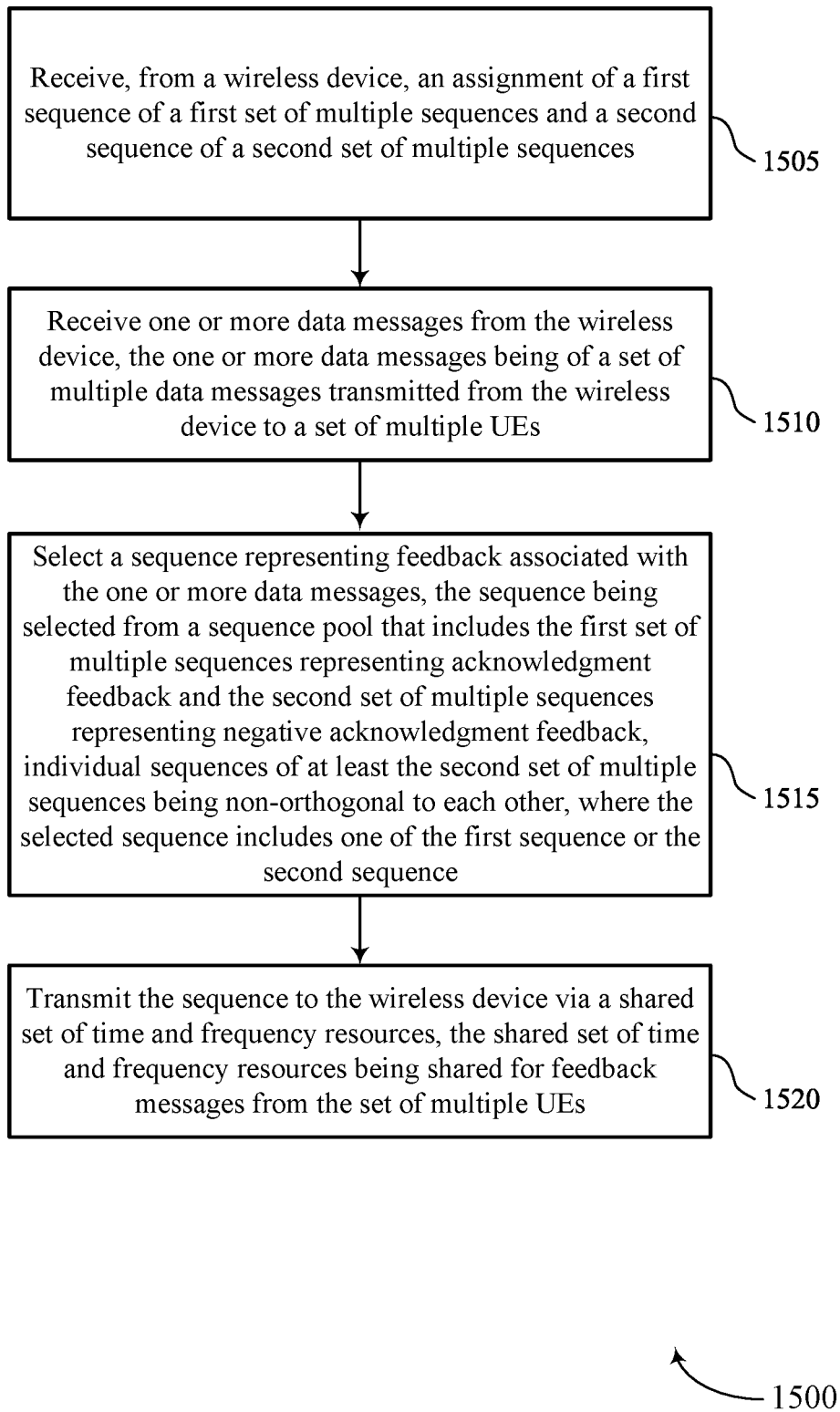

FIG. 15 shows a flowchart illustrating a method 1500 that supports soft multiplexing of feedback in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a wireless device, an assignment of a first sequence of a first set of multiple sequences and a second sequence of a second set of multiple sequences. The operations of 1505 may be performed in accordance with examples as disclosed herein. In some examples, aspects of the operations of 1505 may be performed by an assignment receiver 840 as described with reference to FIG. 8.

At 1510, the method may include receiving one or more data messages from the wireless device, the one or more data messages being of a set of multiple data messages transmitted from the wireless device to a set of multiple UEs. The operations of 1510 may be performed in accordance with examples as disclosed herein. In some examples, aspects of the operations of 1510 may be performed by a data message receiver 825 as described with reference to FIG. 8.

At 1515, the method may include selecting a sequence representing feedback associated with the one or more data messages, the sequence being selected from a sequence pool that includes the first set of multiple sequences representing acknowledgment feedback and the second set of multiple sequences representing negative acknowledgment feedback, individual sequences of at least the second set of multiple sequences being non-orthogonal to each other, where the selected sequence includes one of the first sequence or the second sequence. The operations of 1515 may be performed in accordance with examples as disclosed herein. In some examples, aspects of the operations of 1515 may be performed by a sequence selector 830 as described with reference to FIG. 8.

At 1520, the method may include transmitting the sequence to the wireless device via a shared set of time and frequency resources, the shared set of time and frequency resources being shared for feedback messages from the set of multiple UEs. The operations of 1520 may be performed in accordance with examples as disclosed herein. In some examples, aspects of the operations of 1520 may be performed by a sequence transmitter 835 as described with reference to FIG. 8.

Figure 16:
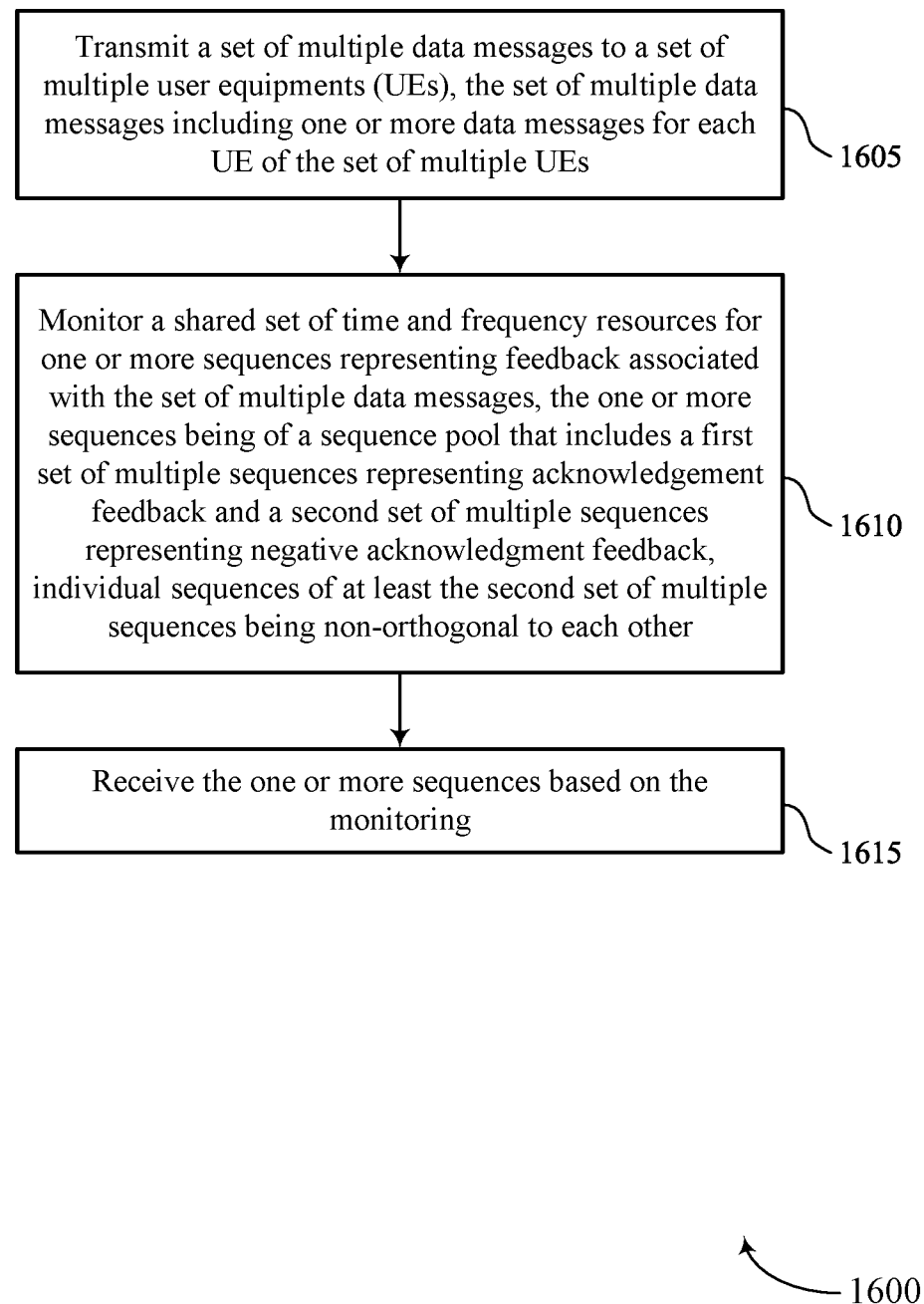

FIG. 16 shows a flowchart illustrating a method 1600 that supports soft multiplexing of feedback in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include transmitting a set of multiple data messages to a set of multiple user equipments (UEs), the set of multiple data messages including one or more data messages for each UE of the set of multiple UEs. The operations of 1605 may be performed in accordance with examples as disclosed herein. In some examples, aspects of the operations of 1605 may be performed by a data message transmitter 1225 as described with reference to FIG. 12.

At 1610, the method may include monitoring a shared set of time and frequency resources for one or more sequences representing feedback associated with the set of multiple data messages, the one or more sequences being of a sequence pool that includes a first set of multiple sequences representing acknowledgement feedback and a second set of multiple sequences representing negative acknowledgment feedback, individual sequences of at least the second set of multiple sequences being non-orthogonal to each other. The operations of 1610 may be performed in accordance with examples as disclosed herein. In some examples, aspects of the operations of 1610 may be performed by a sequence monitoring component 1230 as described with reference to FIG. 12.

At 1615, the method may include receiving the one or more sequences based on the monitoring. The operations of 1615 may be performed in accordance with examples as disclosed herein. In some examples, aspects of the operations of 1615 may be performed by a sequence receiver 1235 as described with reference to FIG. 12.

Figure 17:
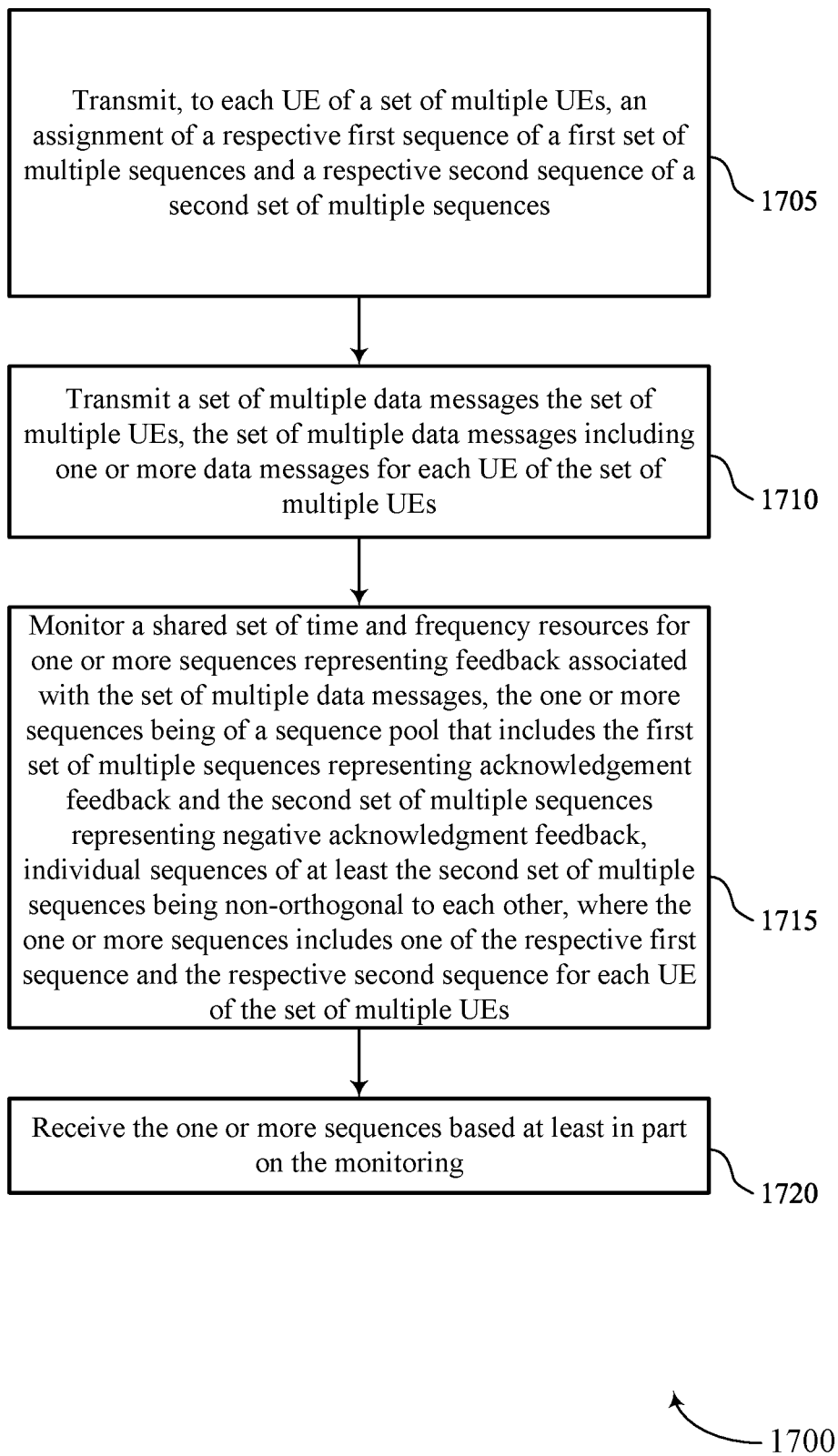

FIG. 17 shows a flowchart illustrating a method 1700 that supports soft multiplexing of feedback in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to each UE of a set of multiple UEs, an assignment of a respective first sequence of a first set of multiple sequences and a respective second sequence of a second set of multiple sequences. The operations of 1705 may be performed in accordance with examples as disclosed herein. In some examples, aspects of the operations of 1705 may be performed by an assignment transmitter 1240 as described with reference to FIG. 12.

At 1710, the method may include transmitting a set of multiple data messages the set of multiple UEs, the set of multiple data messages including one or more data messages for each UE of the set of multiple UEs. The operations of 1710 may be performed in accordance with examples as disclosed herein. In some examples, aspects of the operations of 1710 may be performed by a data message transmitter 1225 as described with reference to FIG. 12.

At 1715, the method may include monitoring a shared set of time and frequency resources for one or more sequences representing feedback associated with the set of multiple data messages, the one or more sequences being of a sequence pool that includes the first set of multiple sequences representing acknowledgement feedback and the second set of multiple sequences representing negative acknowledgment feedback, individual sequences of at least the second set of multiple sequences being non-orthogonal to each other, where the one or more sequences includes one of the respective first sequence and the respective second sequence for each UE of the set of multiple UEs. The operations of 1715 may be performed in accordance with examples as disclosed herein. In some examples, aspects of the operations of 1715 may be performed by a sequence monitoring component 1230 as described with reference to FIG. 12.

At 1720, the method may include receiving the one or more sequences based on the monitoring. The operations of 1720 may be performed in accordance with examples as disclosed herein. In some examples, aspects of the operations of 1720 may be performed by a sequence receiver 1235 as described with reference to FIG. 12.

The following provides an overview of aspects of the present disclosure:

Aspect 1: A method for wireless communication at a UE, comprising: receiving one or more data messages from a wireless device, the one or more data messages being of a plurality of data messages transmitted from the wireless device to a plurality of UEs; selecting a sequence representing feedback associated with the one or more data messages, the sequence being selected from a sequence pool that includes a first plurality of sequences representing acknowledgment feedback and a second plurality of sequences representing negative acknowledgment feedback, individual sequences of at least the second plurality of sequences being non-orthogonal to each other; and transmitting the sequence to the wireless device via a shared set of time and frequency resources, the shared set of time and frequency resources being shared for feedback messages from the plurality of UEs.

Aspect 2: The method of aspect 1, wherein selecting the sequence comprises: selecting the sequence from the sequence pool, wherein individual sequences of the first plurality of sequences of the sequence pool are orthogonal with each other, and wherein each sequence of the first plurality of sequences is orthogonal with each sequence of the second plurality of sequences.

Aspect 3: The method of any of aspects 1 through 2, wherein selecting the sequence comprises: selecting the sequence from the sequence pool, wherein individual sequences of the first plurality of sequences of the sequence pool are orthogonal with each other, and wherein each sequence of the first plurality of sequences is non-orthogonal with each sequence of the second plurality of sequences.

Aspect 4: The method of any of aspects 1 through 3, wherein selecting the sequence comprises: selecting the sequence from the sequence pool, wherein individual sequences of the first plurality of sequences of the sequence pool are non-orthogonal with each other, and wherein each sequence of the first plurality of sequences is orthogonal with each sequence of the second plurality of sequences.

Aspect 5: The method of any of aspects 1 through 4, wherein selecting the sequence comprises: selecting the sequence from the sequence pool, wherein individual sequences of the first plurality of sequences of the sequence pool are non-orthogonal with each other, and wherein each sequence of the first plurality of sequences is non-orthogonal with each sequence of the second plurality of sequences.

Aspect 6: The method of any of aspects 1 through 5, wherein transmitting the sequence to the wireless device via the shared set of time and frequency resources comprises transmitting the sequence via a resource block of the shared set of time and frequency resources, a total number of resource blocks associated with the shared set of time and frequency resources is less than a total number of UEs of the plurality of UEs.

Aspect 7: The method of any of aspects 1 through 6, further comprising: receiving, from the wireless device, an assignment of a first sequence of the first plurality of sequences and a second sequence of the second plurality of sequences, wherein the selected sequence comprises one of the first sequence or the second sequence.

Aspect 8: The method of any of aspects 1 through 7, wherein the one or more data messages comprise a first data message, wherein the sequence represents feedback for the first data message, the method further comprising: selecting an additional sequence representing feedback for the first data message, the additional sequence selected from the sequence pool; and transmitting the additional sequence to the wireless device via the shared set of time and frequency resources.

Aspect 9: The method of any of aspects 1 through 8, wherein the one or more data messages comprise a first data message and a second data message, and wherein the sequence represents feedback for the first data message, the method further comprising: selecting an additional sequence representing feedback for the second data message, the additional sequence selected from the sequence pool; and transmitting the additional sequence to the wireless device via the shared set of time and frequency resources.

Aspect 10: The method of any of aspects 1 through 9, further comprising: receiving, from the wireless device, an indication for the UE to select at least two sequences for the one or more data messages; selecting an additional sequence representing feedback for the one or more data messages based at least in part on receiving the indication for the UE to select the at least two sequences; and transmitting the additional sequence to the wireless device via the shared set of time and frequency resources.

Aspect 11: The method of any of aspects 1 through 10, wherein a total number of degrees of freedom between sequences of the second plurality of sequences is less than a total number of degrees of freedom between sequences of the first plurality of sequences.

Aspect 12: The method of any of aspects 1 through 11, wherein the wireless device comprises a UE excluded from the plurality of UEs, and the sequence is transmitted via a sidelink shared channel Aspect 13: The method of any of aspects 1 through 12, wherein the wireless device comprises a base station, and the sequence is transmitted via an uplink shared channel Aspect 14: The method of any of aspects 1 through 13, wherein a total number of degrees of freedom between sequences of the second plurality of sequences is associated with a retransmission capability of the wireless device.

Aspect 15: The method of aspect 14, wherein the individual sequences of at least the second plurality of sequences are non-orthogonal to each other based at least in part on the total number of degrees of freedom being below a threshold.

Aspect 16: A method for wireless communication at a wireless device, comprising: transmitting a plurality of data messages to a plurality of UEs, the plurality of data messages comprising one or more data messages for each UE of the plurality of UEs; monitoring a shared set of time and frequency resources for one or more sequences representing feedback associated with the plurality of data messages, the one or more sequences being of a sequence pool that includes a first plurality of sequences representing acknowledgement feedback and a second plurality of sequences representing negative acknowledgment feedback, individual sequences of at least the second plurality of sequences being non-orthogonal to each other; and receiving the one or more sequences based at least in part on the monitoring.

Aspect 17: The method of aspect 16, wherein monitoring the shared set of time and frequency resources comprises: monitoring the shared set of time and frequency resources for the one or more sequences, wherein individual sequences of the first plurality of sequences of the sequence pool are orthogonal with each other, and wherein each sequence of the first plurality of sequences is orthogonal with each sequence of the second plurality of sequences.

Aspect 18: The method of any of aspects 16 through 17, wherein monitoring the shared set of time and frequency resources comprises: monitoring the shared set of time and frequency resources for the one or more sequences, wherein individual sequences of the first plurality of sequences of the sequence pool are orthogonal with each other, and wherein each sequence of the first plurality of sequences is non-orthogonal with each sequence of the second plurality of sequences.

Aspect 19: The method of any of aspects 16 through 18, wherein monitoring the shared set of time and frequency resources comprises: monitoring the shared set of time and frequency resources for the one or more sequences, wherein individual sequences of the first plurality of sequences of the sequence pool are non-orthogonal with each other, and wherein each sequence of the first plurality of sequences is orthogonal with each sequence of the second plurality of sequences.

Aspect 20: The method of any of aspects 16 through 19, wherein monitoring the shared set of time and frequency resources comprises: monitoring the shared set of time and frequency resources for the one or more sequences, wherein individual sequences of the first plurality of sequences of the sequence pool are non-orthogonal with each other, and wherein each sequence of the first plurality of sequences is non-orthogonal with each sequence of the second plurality of sequences.

Aspect 21: The method of any of aspects 16 through 20, wherein receiving the one or more sequences comprises:

receiving at least one sequence of the one or more sequences via a resource block of the shared set of time and frequency resources, wherein a total number of resource blocks associated with the shared set of time and frequency resources is less than a total number of UEs of the plurality of UEs.

Aspect 22: The method of any of aspects 16 through 21, further comprising: transmitting, to each UE of the plurality of UEs, an assignment of a respective first sequence of the first plurality of sequences and a respective second sequence of the second plurality of sequences, wherein the one or more sequences comprises one of the respective first sequence and the respective second sequence for each UE of the plurality of UEs.

Aspect 23: The method of any of aspects 16 through 22, wherein the one or more data messages for a UE of the plurality of UEs comprise a first data message, the method further comprising: monitoring the shared set of time and frequency resources for a first sequence of the one or more sequences representing feedback for the first data message and a second sequence of the one or more sequences representing feedback for the first data message, the first sequence and the second sequence selected from the sequence pool; and receiving, from the UE of the plurality of UEs, the first sequence and the second sequence.

Aspect 24: The method of any of aspects 16 through 23, wherein the one or more data messages for a UE of the plurality of UEs comprise a first data message and a second data message, the method further comprising: monitoring the shared set of time and frequency resources for a first sequence of the one or more sequences representing feedback for the first data message and a second sequence of the one or more sequences representing feedback for the second data message, the first sequence and the second sequence selected from the sequence pool; and receiving, from the UE of the plurality of UEs, the first sequence and the second sequence.

Aspect 25: The method of any of aspects 16 through 24, further comprising: transmitting, to a UE of the plurality of UEs, an indication for the UE to select at least two sequences for the one or more data messages for the UE; monitoring the shared set of time and frequency resources for a first sequence representing feedback for the one or more data messages for the UE and a second sequence representing feedback for the one or more data messages for the UE based at least in part on transmitting the indication for the UE to select the at least two sequences; and receiving, from the UE of the plurality of UEs, the first sequence and the second sequence.

Aspect 26: The method of any of aspects 16 through 25, wherein a total number of degrees of freedom between sequences of the second plurality of sequences is less than a total number of degrees of freedom between sequences of the first plurality of sequences.

Aspect 27: The method of any of aspects 16 through 26, wherein the wireless device comprises a UE excluded from the plurality of UEs, and each of the one or more sequences is received via a respective sidelink shared channel Aspect 28: The method of any of aspects 16 through 27, wherein the wireless device comprises a base station, and the each of the one or more sequences is received via a respective uplink shared channel Aspect 29: An apparatus for wireless communication at a UE, comprising a processor; memory coupled with the processor; and instructions stored in the memory and executable by the processor to cause the apparatus to perform a method of any of aspects 1 through 15.

Aspect 30: An apparatus for wireless communication at a UE, comprising at least one means for performing a method of any of aspects 1 through 15.

Aspect 31: A non-transitory computer-readable medium storing code for wireless communication at a UE, the code comprising instructions executable by a processor to perform a method of any of aspects 1 through 15.

Aspect 32: An apparatus for wireless communication at a wireless device, comprising a processor; memory coupled with the processor; and instructions stored in the memory and executable by the processor to cause the apparatus to perform a method of any of aspects 16 through 28.

Aspect 33: An apparatus for wireless communication at a wireless device, comprising at least one means for performing a method of any of aspects 16 through 28.

Aspect 34: A non-transitory computer-readable medium storing code for wireless communication at a wireless device, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving one or more data messages from a wireless device, the one or more data messages being of a plurality of data messages transmitted from the wireless device to a plurality of UEs;
    selecting, at the UE, a sequence representing feedback associated with the one or more data messages based at least in part on individual ones of a plurality of parameters having a zero value or a non-zero value, each of the plurality of parameters associated with cross-correlation between types of feedback messages, the sequence being selected from a sequence pool that includes a first plurality of sequences representing acknowledgment feedback and a second plurality of sequences representing negative acknowledgment feedback, individual sequences of at least the second plurality of sequences being non-orthogonal to each other; and
    transmitting the sequence to the wireless device via a shared set of time and frequency resources, the shared set of time and frequency resources being shared for feedback messages from the plurality of UEs.

2. The method of claim 1, wherein selecting the sequence comprises:
    selecting the sequence from the sequence pool, wherein individual sequences of the first plurality of sequences of the sequence pool are orthogonal with each other, and wherein each sequence of the first plurality of sequences is orthogonal with each sequence of the second plurality of sequences.

3. The method of claim 1, wherein selecting the sequence comprises:
    selecting the sequence from the sequence pool, wherein individual sequences of the first plurality of sequences of the sequence pool are orthogonal with each other, and wherein each sequence of the first plurality of sequences is non-orthogonal with each sequence of the second plurality of sequences.

4. The method of claim 1, wherein selecting the sequence comprises:

selecting the sequence from the sequence pool, wherein individual sequences of the first plurality of sequences of the sequence pool are non-orthogonal with each other, and wherein each sequence of the first plurality of sequences is orthogonal with each sequence of the second plurality of sequences.

5. The method of claim 1, wherein selecting the sequence comprises:
selecting the sequence from the sequence pool, wherein individual sequences of the first plurality of sequences of the sequence pool are non-orthogonal with each other, and wherein each sequence of the first plurality of sequences is non-orthogonal with each sequence of the second plurality of sequences.

6. The method of claim 1, wherein transmitting the sequence to the wireless device via the shared set of time and frequency resources comprises transmitting the sequence via a resource block of the shared set of time and frequency resources, wherein a total number of resource blocks associated with the shared set of time and frequency resources is less than a total number of UEs of the plurality of UEs.

7. The method of claim 1, further comprising:
receiving, from the wireless device, an assignment of a first sequence of the first plurality of sequences and a second sequence of the second plurality of sequences, wherein the selected sequence comprises one of the first sequence or the second sequence.

8. The method of claim 1, wherein the one or more data messages comprise a first data message, wherein the sequence represents feedback for the first data message, the method further comprising:
selecting an additional sequence representing feedback for the first data message, the additional sequence selected from the sequence pool; and
transmitting the additional sequence to the wireless device via the shared set of time and frequency resources.

9. The method of claim 1, wherein the one or more data messages comprise a first data message and a second data message, and wherein the sequence represents feedback for the first data message, the method further comprising:
selecting an additional sequence representing feedback for the second data message, the additional sequence selected from the sequence pool; and
transmitting the additional sequence to the wireless device via the shared set of time and frequency resources.

10. The method of claim 1, further comprising:
receiving, from the wireless device, an indication for the UE to select at least two sequences for the one or more data messages;
selecting an additional sequence representing feedback for the one or more data messages based at least in part on receiving the indication for the UE to select the at least two sequences; and
transmitting the additional sequence to the wireless device via the shared set of time and frequency resources.

11. The method of claim 1, wherein a total number of degrees of freedom between sequences of the second plurality of sequences is less than a total number of degrees of freedom between sequences of the first plurality of sequences.

12. The method of claim 1, wherein the wireless device comprises a second UE excluded from the plurality of UEs, and the sequence is transmitted via a sidelink shared channel.

13. The method of claim 1, wherein the wireless device comprises a base station, and the sequence is transmitted via an uplink shared channel.

14. The method of claim 1, wherein a total number of degrees of freedom between sequences of the second plurality of sequences is associated with a retransmission capability of the wireless device.

15. The method of claim 14, wherein the individual sequences of at least the second plurality of sequences are non-orthogonal to each other based at least in part on the total number of degrees of freedom being below a threshold.

16. A method for wireless communication at a wireless device, comprising:
transmitting a plurality of data messages to a plurality of user equipments (UEs), the plurality of data messages comprising one or more data messages for each UE of the plurality of UEs;
monitoring a shared set of time and frequency resources for one or more sequences representing feedback associated with the plurality of data messages, the one or more sequences corresponding to individual ones of a plurality of parameters having a zero value or a non-zero value, each of the plurality of parameters associated with cross-correlation between types of feedback messages, the one or more sequences being of a sequence pool that includes a first plurality of sequences representing acknowledgement feedback and a second plurality of sequences representing negative acknowledgment feedback, individual sequences of at least the second plurality of sequences being non-orthogonal to each other; and
receiving the one or more sequences based at least in part on the monitoring.

17. The method of claim 16, wherein monitoring the shared set of time and frequency resources comprises:
monitoring the shared set of time and frequency resources for the one or more sequences, wherein individual sequences of the first plurality of sequences of the sequence pool are orthogonal with each other, and wherein each sequence of the first plurality of sequences is orthogonal with each sequence of the second plurality of sequences.

18. The method of claim 16, wherein monitoring the shared set of time and frequency resources comprises:
monitoring the shared set of time and frequency resources for the one or more sequences, wherein individual sequences of the first plurality of sequences of the sequence pool are orthogonal with each other, and wherein each sequence of the first plurality of sequences is non-orthogonal with each sequence of the second plurality of sequences.

19. The method of claim 16, wherein monitoring the shared set of time and frequency resources comprises:
monitoring the shared set of time and frequency resources for the one or more sequences, wherein individual sequences of the first plurality of sequences of the sequence pool are non-orthogonal with each other, and wherein each sequence of the first plurality of sequences is orthogonal with each sequence of the second plurality of sequences.

20. The method of claim 16, wherein monitoring the shared set of time and frequency resources comprises:
monitoring the shared set of time and frequency resources for the one or more sequences, wherein individual sequences of the first plurality of sequences of the sequence pool are non-orthogonal with each other, and wherein each sequence of the first plurality of sequences is non-orthogonal with each sequence of the second plurality of sequences.

21. The method of claim 16, wherein receiving the one or more sequences comprises:
receiving at least one sequence of the one or more sequences via a resource block of the shared set of time and frequency resources, wherein a total number of resource blocks associated with the shared set of time and frequency resources is less than a total number of UEs of the plurality of UEs.

22. The method of claim 16, further comprising:
transmitting, to each UE of the plurality of UEs, an assignment of a respective first sequence of the first plurality of sequences and a respective second sequence of the second plurality of sequences, wherein the one or more sequences comprises one of the respective first sequence and the respective second sequence for each UE of the plurality of UEs.

23. The method of claim 16, wherein the one or more data messages for a UE of the plurality of UEs comprise a first data message, the method further comprising:
monitoring the shared set of time and frequency resources for a first sequence of the one or more sequences representing feedback for the first data message and a second sequence of the one or more sequences representing feedback for the first data message, the first sequence and the second sequence selected from the sequence pool; and
receiving, from the UE of the plurality of UEs, the first sequence and the second sequence.

24. The method of claim 16, wherein the one or more data messages for a UE of the plurality of UEs comprise a first data message and a second data message, the method further comprising:
monitoring the shared set of time and frequency resources for a first sequence of the one or more sequences representing feedback for the first data message and a second sequence of the one or more sequences representing feedback for the second data message, the first sequence and the second sequence selected from the sequence pool; and
receiving, from the UE of the plurality of UEs, the first sequence and the second sequence.

25. The method of claim 16, further comprising:
transmitting, to a UE of the plurality of UEs, an indication for the UE to select at least two sequences for the one or more data messages for the UE;
monitoring the shared set of time and frequency resources for a first sequence representing feedback for the one or more data messages for the UE and a second sequence representing feedback for the one or more data messages for the UE based at least in part on transmitting the indication for the UE to select the at least two sequences; and
receiving, from the UE of the plurality of UEs, the first sequence and the second sequence.

26. The method of claim 16, wherein a total number of degrees of freedom between sequences of the second plurality of sequences is less than a total number of degrees of freedom between sequences of the first plurality of sequences.

27. The method of claim 16, wherein the wireless device comprises a UE excluded from the plurality of UEs, and each of the one or more sequences is received via a respective sidelink shared channel.

28. The method of claim 16, wherein the wireless device comprises a base station, and each of the one or more sequences is received via a respective uplink shared channel.

29. An apparatus for wireless communication at a user equipment (UE), comprising:
one or more processors;
one or more memories coupled with the one or more processors; and
instructions stored in the one or more memories and executable by the one or more processors to cause the apparatus to:
receive one or more data messages from a wireless device, the one or more data messages being of a plurality of data messages transmitted from the wireless device to a plurality of UEs;
select, at the UE, a sequence representing feedback associated with the one or more data messages based at least in part on individual ones of a plurality of parameters having a zero value or a non-zero value, each of the plurality of parameters associated with cross-correlation between types of feedback messages, the sequence being selected from a sequence pool that includes a first plurality of sequences representing acknowledgment feedback and a second plurality of sequences representing negative acknowledgment feedback, individual sequences of at least the second plurality of sequences being non-orthogonal to each other; and
transmit the sequence to the wireless device via a shared set of time and frequency resources, the shared set of time and frequency resources being shared for feedback messages from the plurality of UEs.

30. An apparatus for wireless communication at a wireless device, comprising:
one or more processors;
one or more memories coupled with the one or more processors; and
instructions stored in the one or more memories and executable by the one or more processors to cause the apparatus to:
transmit a plurality of data messages to a plurality of user equipments (UEs), the plurality of data messages comprising one or more data messages for each UE of the plurality of UEs;
monitor a shared set of time and frequency resources for one or more sequences representing feedback associated with the plurality of data messages, the one or more sequences corresponding to individual ones of a plurality of parameters having a zero value or a non-zero value, each of the plurality of parameters associated with cross-correlation between types of feedback messages, the one or more sequences being of a sequence pool that includes a first plurality of sequences representing acknowledgement feedback and a second plurality of sequences representing negative acknowledgment feedback, individual sequences of at least the second plurality of sequences being non-orthogonal to each other; and
receive the one or more sequences based at least in part on the monitoring.

* * * * *